(12) United States Patent
Vandersmissen et al.

(10) Patent No.: US 11,904,841 B2
(45) Date of Patent: Feb. 20, 2024

(54) SUSPENSION SYSTEM INTEGRATION WITH ADVANCED DRIVER ASSISTANCE SYSTEM

(71) Applicant: DRiV Automotive Inc., Southfield, MI (US)

(72) Inventors: Bert Vandersmissen, Lovenjoel (BE); Peter Boon, Merchtem (BE)

(73) Assignee: DRiV Automotive Inc., Northville, MI (US)

( * ) Notice: Subject to any disclaimer, the term of this patent is extended or adjusted under 35 U.S.C. 154(b) by 0 days.

(21) Appl. No.: 17/499,679

(22) Filed: Oct. 12, 2021

(65) Prior Publication Data

US 2023/0113819 A1   Apr. 13, 2023

(51) Int. Cl.
*B60G 17/016*   (2006.01)
*B60W 30/045*   (2012.01)
(Continued)

(52) U.S. Cl.
CPC ....... *B60W 30/045* (2013.01); *B60G 17/0152* (2013.01); *B60G 17/0162* (2013.01);
(Continued)

(58) Field of Classification Search
CPC .... B60W 30/045; B60W 10/04; B60W 10/18; B60W 10/20; B60W 2520/10;
(Continued)

(56) References Cited

U.S. PATENT DOCUMENTS

| 3,334,913 A | 8/1967 | Margala |
| 3,635,460 A | 1/1972 | Shilton et al. |

(Continued)

FOREIGN PATENT DOCUMENTS

| CN | 103807344 A | 5/2014 |
| CN | 204037280 U | 12/2014 |

(Continued)

OTHER PUBLICATIONS

International Search Report and Written Opinion regarding International Patent Application No. PCT/US2022/046029, dated Dec. 20, 2022.

(Continued)

*Primary Examiner* — Toan C To
(74) *Attorney, Agent, or Firm* — Harness, Dickey & Pierce, P.L.C.

(57) ABSTRACT

A suspension system and associated control methods for improving the effectiveness of driver assistance systems is disclosed where the driver assistance systems can generate and send requests to a suspension control unit (SCU) of the suspension system to actuate (e.g., close) one or more comfort valves in the suspension system to increase the roll stiffness and/or pitch stiffness of the suspension system when the driver assistance systems are taking corrective action. As part of a two-way communication between the suspension control unit (SCU) and the driver assistance systems, the suspension control unit (SCU) communicates target stiffnesses and/or calculated effective stiffnesses to the driver assistance systems, which is used to update the vehicle stability models used by the driver assistance systems.

20 Claims, 10 Drawing Sheets

(51) Int. Cl.
<table>
<tr><td>B60G 17/015</td><td>(2006.01)</td></tr>
<tr><td>B60G 17/0195</td><td>(2006.01)</td></tr>
<tr><td>B60G 17/08</td><td>(2006.01)</td></tr>
<tr><td>B60W 10/04</td><td>(2006.01)</td></tr>
<tr><td>B60W 10/18</td><td>(2012.01)</td></tr>
<tr><td>B60W 10/20</td><td>(2006.01)</td></tr>
</table>

(52) U.S. Cl.
CPC ......... *B60G 17/0195* (2013.01); *B60G 17/08* (2013.01); *B60W 10/04* (2013.01); *B60W 10/18* (2013.01); *B60W 10/20* (2013.01); *B60G 2202/24* (2013.01); *B60G 2400/106* (2013.01); *B60G 2400/204* (2013.01); *B60G 2400/412* (2013.01); *B60G 2400/5182* (2013.01); *B60G 2500/104* (2013.01); *B60G 2500/40* (2013.01); *B60G 2800/014* (2013.01); *B60G 2800/0122* (2013.01); *B60G 2800/244* (2013.01); *B60G 2800/246* (2013.01); *B60G 2800/70* (2013.01); *B60G 2800/94* (2013.01); *B60W 2520/10* (2013.01); *B60W 2520/105* (2013.01); *B60W 2520/12* (2013.01); *B60W 2520/16* (2013.01); *B60W 2520/18* (2013.01); *B60W 2540/10* (2013.01); *B60W 2540/12* (2013.01); *B60W 2540/18* (2013.01)

(58) Field of Classification Search
CPC ....... B60W 2520/105; B60W 2520/12; B60W 2520/16; B60W 2520/18; B60W 2540/10; B60W 2540/12; B60W 2540/18; B60G 17/0152; B60G 17/0162; B60G 17/0195; B60G 17/08; B60G 2202/24; B60G 2400/106; B60G 2400/204; B60G 2400/412; B60G 2400/5182; B60G 2500/104; B60G 2500/40; B60G 2800/0122; B60G 2800/014; B60G 2800/244; B60G 2800/246; B60G 2800/70; B60G 2800/94

See application file for complete search history.

(56) References Cited

U.S. PATENT DOCUMENTS

| | | |
|---|---|---|
| 4,076,275 A | 2/1978 | Hiruma |
| 4,270,771 A | 6/1981 | Fujii |
| 4,349,077 A | 9/1982 | Sekiguchi et al. |
| 4,390,188 A | 6/1983 | Rouse |
| 4,537,411 A | 8/1985 | Naramoto |
| 4,625,993 A | 12/1986 | Williams et al. |
| 4,830,394 A | 5/1989 | Tanaka et al. |
| 4,848,790 A | 7/1989 | Fukunaga et al. |
| 4,911,468 A | 3/1990 | Fukunaga |
| 4,911,470 A | 3/1990 | Fukunaga |
| 4,973,079 A | 11/1990 | Tsukamoto |
| 4,999,777 A | 3/1991 | Schussler et al. |
| 5,033,770 A | 7/1991 | Kamimura et al. |
| 5,037,128 A | 8/1991 | Okuyama et al. |
| 5,056,812 A | 10/1991 | Takehara et al. |
| 5,074,624 A | 12/1991 | Stauble et al. |
| 5,085,458 A | 2/1992 | Kii et al. |
| 5,085,459 A | 2/1992 | Sato et al. |
| 5,097,419 A | 3/1992 | Lizell |
| 5,100,167 A | 3/1992 | Kamimura |
| 5,119,297 A | 6/1992 | Buma et al. |
| 5,145,206 A | 9/1992 | Williams |
| 5,160,161 A | 11/1992 | Tsukamoto et al. |
| 5,162,995 A | 11/1992 | Ikemoto et al. |
| 5,174,598 A | 12/1992 | Sato et al. |
| 5,188,390 A | 2/1993 | Clark |
| 5,193,845 A | 3/1993 | Yokote et al. |
| 5,199,854 A | 4/1993 | Aoyama |
| 5,251,929 A | 10/1993 | Kawabata |
| 5,322,319 A | 6/1994 | Tanaka et al. |
| 5,515,277 A | 5/1996 | Mine |
| 5,529,324 A | 6/1996 | Krawczyk et al. |
| 5,556,115 A | 9/1996 | Heyring |
| 5,562,305 A | 10/1996 | Heyring et al. |
| 5,601,307 A | 2/1997 | Heyring et al. |
| 5,619,413 A | 4/1997 | Oakley |
| 5,630,623 A | 5/1997 | Ganzel |
| 5,631,632 A | 5/1997 | Nakashima et al. |
| 5,735,540 A | 4/1998 | Schiffler |
| 5,769,400 A | 6/1998 | Holzl et al. |
| 6,010,139 A | 1/2000 | Heyring et al. |
| 6,015,155 A | 1/2000 | Brookes et al. |
| 6,202,010 B1 | 3/2001 | Shono et al. |
| 6,259,982 B1 | 7/2001 | Williams et al. |
| 6,266,590 B1 | 7/2001 | Kutscher et al. |
| 6,282,470 B1 | 8/2001 | Shono et al. |
| 6,374,193 B1 | 4/2002 | Kutscher et al. |
| 6,470,248 B2 | 10/2002 | Shank et al. |
| 6,502,837 B1 | 1/2003 | Hamilton et al. |
| 6,519,517 B1 | 2/2003 | Heyring et al. |
| 6,556,908 B1 | 4/2003 | Lu et al. |
| 6,669,216 B1 | 12/2003 | Elser et al. |
| 6,761,371 B1 | 7/2004 | Heyring et al. |
| 6,859,713 B2 | 2/2005 | Pallot |
| 6,880,332 B2 | 4/2005 | Pfaff et al. |
| 7,311,314 B2 | 12/2007 | Kasamatsu |
| 7,311,316 B2 | 12/2007 | Yasui et al. |
| 7,350,793 B2 | 4/2008 | Munday |
| 7,472,914 B2 | 1/2009 | Anderson et al. |
| 7,686,309 B2 | 3/2010 | Munday et al. |
| 7,862,052 B2 | 1/2011 | Germain |
| 8,075,002 B1 | 12/2011 | Pionke et al. |
| 8,123,235 B2 | 2/2012 | Monk et al. |
| 8,459,619 B2 | 6/2013 | Trinh et al. |
| 8,672,337 B2 | 3/2014 | van der Knaap et al. |
| 8,695,768 B2 | 4/2014 | Kiriyama |
| 9,080,631 B2 | 7/2015 | Hoult |
| 9,150,282 B2 | 10/2015 | Heyring et al. |
| 9,428,022 B2 | 8/2016 | Coombs et al. |
| 9,597,940 B2 | 3/2017 | Anderson et al. |
| 9,829,014 B2 | 11/2017 | Kleitsch et al. |
| 10,350,958 B2 | 7/2019 | Stolle |
| 10,421,330 B2 | 9/2019 | Jeong |
| 10,752,075 B1 | 8/2020 | Shukla et al. |
| 11,220,152 B2 | 1/2022 | Witte |
| 11,390,129 B1 * | 7/2022 | Edren ................ B60G 17/0162 |
| 11,529,836 B1 | 12/2022 | Schubart et al. |
| 11,685,220 B2 | 6/2023 | Calchand et al. |
| 2001/0006285 A1 | 7/2001 | Franzini |
| 2003/0182990 A1 | 10/2003 | Stiller |
| 2004/0061292 A1 | 4/2004 | Hall |
| 2004/0113377 A1 | 6/2004 | Klees |
| 2005/0269753 A1 | 12/2005 | Geiger et al. |
| 2006/0151969 A1 | 7/2006 | Revill et al. |
| 2006/0186728 A1 | 8/2006 | Mizuta et al. |
| 2007/0000478 A1 | 1/2007 | Sadakane et al. |
| 2007/0278752 A1 | 12/2007 | Schedgick |
| 2008/0224428 A1 | 9/2008 | Smith et al. |
| 2008/0238004 A1 | 10/2008 | Turco et al. |
| 2008/0269987 A1 | 10/2008 | Barron et al. |
| 2008/0272561 A1 | 11/2008 | Monk et al. |
| 2009/0140501 A1 | 6/2009 | Taylor et al. |
| 2011/0025001 A1 | 2/2011 | Kajino |
| 2012/0098172 A1 | 4/2012 | Trinh et al. |
| 2013/0103259 A1 | 4/2013 | Eng et al. |
| 2014/0195114 A1 | 7/2014 | Tseng et al. |
| 2014/0232082 A1 | 8/2014 | Oshita et al. |
| 2014/0265170 A1 | 9/2014 | Giovanardi et al. |
| 2014/0288776 A1 | 9/2014 | Anderson et al. |
| 2015/0102921 A1 | 4/2015 | Kim |
| 2015/0224845 A1 | 8/2015 | Anderson et al. |
| 2017/0240017 A1 | 8/2017 | Vandersmissen et al. |
| 2017/0291465 A1 | 10/2017 | Christoff et al. |
| 2017/0305226 A1 | 10/2017 | Okimura |
| 2018/0194188 A1 | 7/2018 | Kasuya et al. |
| 2018/0297422 A1 * | 10/2018 | Ciovnicu .......... B60C 23/00318 |
| 2018/0304697 A1 * | 10/2018 | Woodley .......... B60C 23/00354 |
| 2018/0312017 A1 * | 11/2018 | Woodley .......... B60C 23/00354 |

(56) References Cited

U.S. PATENT DOCUMENTS

| | | |
|---|---|---|
| 2018/0345747 A1 | 12/2018 | Boon et al. |
| 2018/0356798 A1* | 12/2018 | Ciovnicu .......... B60C 23/00372 |
| 2019/0178695 A1 | 6/2019 | Bittner et al. |
| 2019/0211897 A1 | 7/2019 | Schneider et al. |
| 2019/0344634 A1 | 11/2019 | Kim |
| 2019/0389271 A1 | 12/2019 | Zanziger |
| 2020/0062068 A1 | 2/2020 | Trangbaek et al. |
| 2020/0094645 A1 | 3/2020 | Edren et al. |
| 2020/0122539 A1 | 4/2020 | Gummesson |
| 2020/0223274 A1 | 7/2020 | Tucker et al. |
| 2020/0247208 A1 | 8/2020 | Kunkel |
| 2020/0324607 A1 | 10/2020 | Georgy et al. |
| 2021/0101434 A1 | 4/2021 | Sawarynski, Jr. et al. |
| 2021/0138866 A1 | 5/2021 | Lee et al. |
| 2021/0178845 A1 | 6/2021 | Cho et al. |
| 2021/0178850 A1 | 6/2021 | Kaldas |
| 2021/0276566 A1 | 9/2021 | Furuta |
| 2021/0283969 A1 | 9/2021 | Danielson et al. |
| 2021/0316716 A1 | 10/2021 | Krosschell et al. |
| 2021/0331545 A1 | 10/2021 | Furuta |
| 2021/0347221 A1 | 11/2021 | Park et al. |
| 2021/0402841 A1 | 12/2021 | Furuta |
| 2022/0016949 A1* | 1/2022 | Graus ................ B60G 17/0164 |
| 2022/0105770 A1 | 4/2022 | Furuta |
| 2022/0105771 A1 | 4/2022 | Furuta |
| 2022/0111695 A1 | 4/2022 | Furuta |
| 2022/0126642 A1 | 4/2022 | Furuta |
| 2022/0144035 A1 | 5/2022 | Al Sakka et al. |
| 2022/0234412 A1 | 7/2022 | Tonkovich et al. |
| 2022/0281280 A1 | 9/2022 | Praet et al. |
| 2022/0314728 A1 | 10/2022 | Borgemenke et al. |
| 2022/0332306 A1 | 10/2022 | Noma et al. |
| 2022/0380004 A1 | 12/2022 | Walker et al. |
| 2022/0396111 A1 | 12/2022 | Favalli et al. |
| 2022/0396112 A1 | 12/2022 | Favalli et al. |
| 2023/0111977 A1* | 4/2023 | Boon ............... B60G 17/01908 701/37 |
| 2023/0113819 A1 | 4/2023 | Vandersmissen et al. |
| 2023/0114717 A1* | 4/2023 | Boon ............... B60G 17/01908 701/37 |
| 2023/0141764 A1 | 5/2023 | Pape |

FOREIGN PATENT DOCUMENTS

| | | |
|---|---|---|
| CN | 204037282 U | 12/2014 |
| CN | 102862456 B | 3/2015 |
| CN | 207059676 U | 3/2018 |
| CN | 207902078 U | 9/2018 |
| CN | 106739915 B | 8/2019 |
| CN | 110329235 B | 5/2021 |
| CN | 214057159 U | 8/2021 |
| CN | 114537072 A | 5/2022 |
| DE | 2844413 C2 | 9/1989 |
| DE | 102008024871 A1 | 11/2009 |
| DE | 102009053758 A1 | 6/2010 |
| DE | 102018206462 A1 | 10/2019 |
| DE | 102020001633 A1 | 10/2020 |
| DE | 102019218699 A1 | 6/2021 |
| EP | 0419865 A1 | 4/1991 |
| EP | 1518721 A1 | 3/2005 |
| EP | 1970229 A1 | 9/2008 |
| EP | 3643544 A1 | 4/2020 |
| FR | 2175848 A1 | 10/1973 |
| GB | 2344323 A | 6/2000 |
| JP | 2005 059613 A | 3/2005 |
| JP | 2005145137 A | 6/2005 |
| JP | 2018016141 A | 2/2018 |
| KR | 20140005557 A | 1/2014 |
| WO | WO-9633879 A1 | 10/1996 |
| WO | WO-2007098559 A1 | 9/2007 |
| WO | WO-2009111826 A1 | 9/2009 |
| WO | WO-2014/152095 A1 | 9/2014 |
| WO | WO-2015055313 A1 | 4/2015 |
| WO | WO-2016072510 A1 | 5/2016 |
| WO | WO-2020185968 A1 | 9/2020 |
| WO | WO-2020214666 A1 | 10/2020 |

OTHER PUBLICATIONS

International Search Report and Written Opinion regarding International Patent Application No. PCT/US2022/046042, dated Dec. 20, 2022.

International Search Report and Written Opinion regarding International Patent Application No. PCT/US2022/046019, dated Dec. 20, 2022.

International Search Report and Written Opinion regarding International Patent Application No. PCT/US2022/046025, dated Jan. 3, 2023.

International Search Report and Written Opinion regarding International Patent Application No. PCT/US2022/046023, dated Jan. 4, 2023.

"Boyle's Law Definition & Practical Applications of Boyle's Gas Law", Apr. 24, 2019 (Apr. 24, 2019), XP093008924, Retrieved from the Internet: <URL:https://inspectapedia.com/aircond/Boyles_Gas_Law.php> [retrieved on Dec. 16, 2022] p. 1-p. 4.

International Search Report and Written Opinion regarding International Patent Application No. PCT/US2022/046027, dated Jan. 2, 2023.

International Search Report and Written Opinion regarding International Patent Application No. PCT/US2022/046037, dated Jan. 30, 2023.

International Search Report and Written Opinion regarding International Patent Application No. PCT/US2022/046038, dated Jan. 27, 2023.

International Search Report and Written Opinion regarding International Patent Application No. PCT/US2022/046053, dated Jan. 30, 2023.

International Search Report and Written Opinion regarding International Patent Application No. PCT/US2022/046033, dated Feb. 2, 2023.

International Search Report and Written Opinion regarding International Patent Application No. PCT/US2022/046048, dated Feb. 6, 2023.

International Search Report and Written Opinion regarding International Patent Application No. PCT/US2022/046021, dated Feb. 20, 2023.

* cited by examiner

SUSPENSION SYSTEM INTEGRATION WITH ADVANCED DRIVER ASSISTANCE SYSTEM

FIELD

The present disclosure relates generally to suspension systems for motor vehicles and more particularly to suspension system integration with advanced driver assistance systems of a vehicle.

BACKGROUND

The statements in this section merely provide background information related to the present disclosure and may not constitute prior art.

Suspension systems improve the ride of a vehicle by absorbing bumps and vibrations that would otherwise unsettle the vehicle body. Suspension systems also improve safety and control by improving contact between the ground and the tires of the vehicle. One drawback of suspension systems is that basic spring/damper arrangements will allow the vehicle to roll/lean right or left during cornering (e.g., in turns), pitch forward under deceleration (e.g., under braking), and pitch back under acceleration. The lateral acceleration the vehicle experiences in turns causes a roll moment where the vehicle will lean/squat to the right when turning left and to the left when turning right. The fore and aft acceleration the vehicle experiences under acceleration and braking causes a pitch moment where the vehicle will lean forward loading the front axle during braking and aft, loading the rear axle, under acceleration. These roll and pitch moments decrease grip, cornering performance, and braking performance and can also be uncomfortable to the driver and passengers. Many vehicles are equipped with stabilizer bars/anti-roll bars, which are mechanical systems that help counteract the roll moments experienced during driving. For example, anti-roll bars are typically mechanical linkages that extend laterally across the width of the vehicle between the right and left dampers. When one of the dampers extends, the anti-roll bar applies a force to the opposite damper that counteracts the roll moment of the vehicle and helps to correct the roll angle to provide flatter cornering. However, there are several draw backs associated with these mechanical systems. First, there are often packaging constraints associated with mechanical systems because a stabilizer bar/anti-roll bar requires a relatively straight, unobstructed path across the vehicle between the dampers. Second, stabilizer bars/anti-roll bars are reactive and work when the suspension starts moving (i.e. leaning). Such mechanical systems cannot be easily switched off or cancelled out when roll stiffness is not needed. Some vehicles do have stabilizer bar/anti-roll bar disconnects that may be manually or electronically actuated, but the complexity and costs associated with these systems make them ill-suited for most vehicle applications. Packaging constraints also limit the ability to provide mechanical systems that effectively limit fore and aft pitch.

In an effort to augment or replace traditional mechanical stabilizer bars/anti-roll bars, anti-roll suspension systems are being developed that hydraulically connect two or more dampers in a hydraulic circuit where the extension of one damper produces a pressure change in the other damper(s) in the hydraulic circuit that makes it more difficult to compress the other damper(s) in the hydraulic circuit. This pressure change in the other damper(s) increases the roll and pitch stiffness of the suspension system of the vehicle. However, the control of such systems are typically divorced from a vehicle's driver assistance systems, like the vehicle's stability control system, anti-lock braking system, anti-rollover system, anti-lane departure system, and/or collision avoidance system. Typically, such systems make interventional throttle, brake, and/or steering inputs and do not initiate changes in the vehicle's suspension system. The vehicle stability models used in such systems also do not typically account for dynamic changes in the roll and/or pitch stiffness of the suspension system.

SUMMARY

This section provides a general summary of the disclosure, and is not a comprehensive disclosure of its full scope or all of its features.

In accordance with one aspect of the subject disclosure, a method of controlling a suspension system of a vehicle is provided. The method includes connecting a plurality of dampers to each other and to a plurality of comfort valves via a plurality of hydraulic circuits. The method includes the steps of retrieving a target roll stiffness and/or a target pressure from a suspension control unit (SCU) of the suspension system and monitoring real-time data from at least one onboard sensor or system. The real-time data includes data reflecting fluid pressure within at least one of the hydraulic circuits, damper displacement for at least one of the dampers, lateral acceleration of the vehicle, vehicle speed, and/or steering wheel angle. The method also includes the steps of calculating an effective roll stiffness of the suspension system based on the real-time data and the target roll stiffness and/or the effective roll stiffness to a driver assistance system. The method proceeds with the steps of generating and updating a vehicle stability model in the driver assistance system based on a combination of the real-time data and the target roll stiffness and/or the effective roll stiffness. The method further includes the steps of: utilizing the vehicle stability model to determine if the vehicle can complete an initiated turn without oversteer or understeer based on the target roll stiffness and/or the effective roll stiffness, utilizing the vehicle stability model to determine if the vehicle can complete the initiated turn at a different target stiffness without oversteer or understeer (if the vehicle cannot complete the initiated turn without oversteer or understeer at the target roll stiffness or the effective roll stiffness), and sending a request from the driver assistance system to the suspension control unit (SCU) for a new comfort valve setting corresponding to the different target stiffness in response to determining that the vehicle can complete the initiated turn at the different target stiffness without oversteer or understeer. The suspension control unit (SCU) then proceeds with the step of initiating the new comfort valve setting corresponding to the different target stiffness by actuating one or more of the comfort valves based on the new comfort valve setting.

In accordance with another aspect of the subject disclosure, the method of controlling the suspension system of the vehicle, includes the steps of retrieving a target pitch stiffness and/or the target pressure from the suspension control unit (SCU) and monitoring the real-time data from the onboard sensor(s) or system(s), where the real-time data includes data reflecting the fluid pressure within one or more of the hydraulic circuits, the damper displacement for one or more of the dampers, longitudinal acceleration of the vehicle, and the vehicle speed. The method also includes the steps of calculating an effective pitch stiffness of the suspension system based on the real-time data and reporting the target pitch stiffness and/or the effective pitch stiffness to the driver assistance system. The method proceeds with the steps of: generating and updating the vehicle stability model in the driver assistance system based on a combination of the real-time data and the target pitch stiffness and/or the effective pitch stiffness, utilizing the vehicle stability model to determine if a different target stiffness should be implemented based on an initiated throttle input or an initiated brake input, and sending a request from the driver assistance system to the suspension control unit (SCU) for a new comfort valve setting corresponding to the different target stiffness in response to determining that a different target stiffness should be implemented for the initiated throttle input or initiated brake input. The suspension control unit (SCU) then proceeds with the step of initiating the new comfort valve setting corresponding to the different target stiffness by actuating one or more of the comfort valves based on the new comfort valve setting.

In accordance with another aspect of the present disclosure, a suspension system of a vehicle is provided. The suspension system includes a plurality of dampers connected in fluid communication with each other and a plurality of comfort valves via a plurality of hydraulic circuits. The suspension system further includes one or more onboard sensors that are configured to generate real-time data regarding the vehicle and a suspension control unit (SCU) that is arranged in electronic communication with the comfort valves and the onboard sensor(s). The suspension control unit (SCU) includes a processor and memory that is configured to monitor the real-time data generated by the onboard sensor(s), retrieve a target roll stiffness, a target pitch stiffness, and/or a target pressure of the suspension system, and calculate an effective roll stiffness and/or an effective pitch stiffness of the suspension system based on the real-time data. The suspension system also includes a driver assistance system that is arranged in electronic communication with the suspension control unit (SCU). The driver assistance system also includes a processor and memory and is configured to generate and update a vehicle stability model based on a combination of the real-time data and at least one of: the target roll stiffness, the target pitch stiffness, the effective roll stiffness, and the effective pitch stiffness. The driver assistance system is programmed to determine if the vehicle can complete an initiated turn without oversteer or understeer based on the target roll stiffness, target pitch stiffness, effective roll stiffness, and/or effective pitch stiffness. If the driver assistance system determines that the vehicle cannot complete the initiated turn without oversteer or understeer at the current roll and/or pitch stiffness, the driver assistance system is programmed to determine if the vehicle can complete the initiated turn at a different target stiffness without oversteer or understeer. If the driver assistance system determines that the vehicle can complete the initiated turn without oversteer or understeer at a different target stiffness, the driver assistance system is programmed to send a request to the suspension control unit (SCU) for a new comfort valve setting that corresponds to the different target stiffness that will allow the vehicle to make the initiated turn. The suspension control unit (SCU) is programmed to initiate the new comfort valve setting corresponding to the different target stiffness by actuating one or more comfort valves based on the new comfort valve setting.

Advantageously, the suspension system of the present disclosure and associated control methods improve the effectiveness of driver assistance systems, like stability control system, anti-lock braking system, anti-rollover system, anti-lane departure system, and/or collision avoidance system, for example, by enabling such systems to send requests to the suspension control unit (SCU) to actuate (e.g., close) one or more comfort valves in the suspension system to increase the roll stiffness and/or pitch stiffness in the suspension system when the driver assistance system is taking corrective action. In addition, the ability of the suspension control unit (SCU) to communicate target stiffnesses and/or calculated effective stiffnesses to the driver assistance system(s) improves the accuracy of the vehicle stability model(s) used by such systems, which translates into improved intervention and control when a corrective action is initiated by one of the drive assistance systems. Ultimately, the two-way communication described herein between the suspension control unit (SCU) and the driver assistance system(s) can improve vehicle safety and reduce the degree to which a driver of the vehicle can perceive corrective actions taken by the driver assistance system(s). In other words, the improvements described herein can make the driver assistance system(s) of the vehicle seem less intrusive to the driver.

BRIEF DESCRIPTION OF THE DRAWINGS

Other advantages of the present disclosure will be readily appreciated, as the same becomes better understood by reference to the following detailed description when considered in connection with the accompanying drawings wherein.

DETAILED DESCRIPTION

Figure 1:
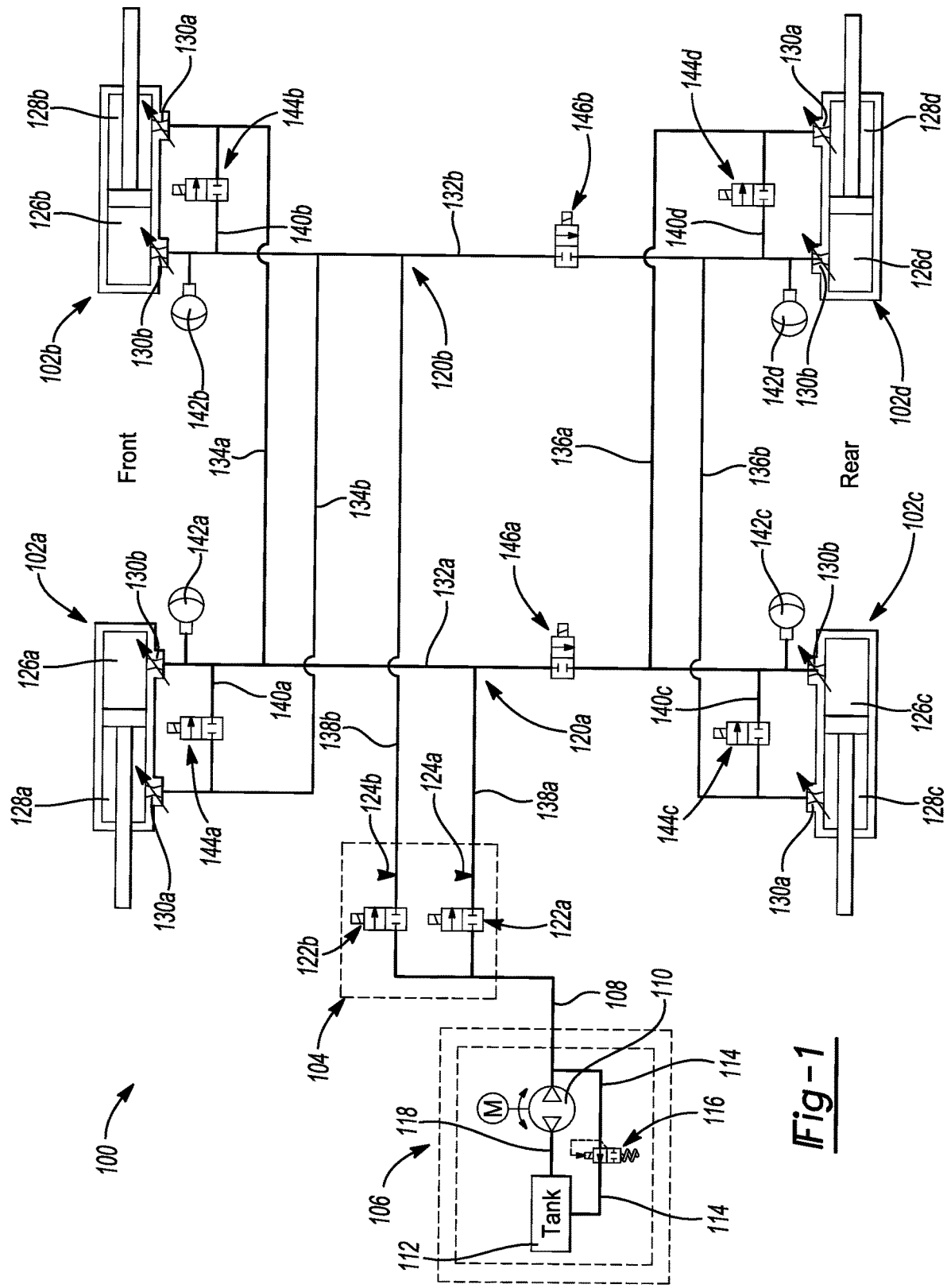
FIG. 1 is a schematic diagram illustrating an exemplary suspension system of the present disclosure that includes two comfort valves that open and close the hydraulic lines connecting the two front dampers to the two rear dampers of the system.

Referring to the Figures, wherein like numerals indicate corresponding parts throughout the several views, various comfort valve equipped suspension systems are shown.

Example embodiments will now be described more fully with reference to the accompanying drawings. Example embodiments are provided so that this disclosure will be thorough, and will fully convey the scope to those who are skilled in the art. Numerous specific details are set forth such as examples of specific components, devices, and methods, to provide a thorough understanding of embodiments of the present disclosure. It will be apparent to those skilled in the art that specific details need not be employed, that example embodiments may be embodied in many different forms and that neither should be construed to limit the scope of the disclosure. In some example embodiments, well-known processes, well-known device structures, and well-known technologies are not described in detail.

The terminology used herein is for the purpose of describing particular example embodiments only and is not intended to be limiting. As used herein, the singular forms "a," "an," and "the" may be intended to include the plural forms as well, unless the context clearly indicates otherwise. The terms "comprises," "comprising," "including," and "having," are inclusive and therefore specify the presence of stated features, integers, steps, operations, elements, and/or components, but do not preclude the presence or addition of one or more other features, integers, steps, operations, elements, components, and/or groups thereof. The method steps, processes, and operations described herein are not to be construed as necessarily requiring their performance in the particular order discussed or illustrated, unless specifically identified as an order of performance. It is also to be understood that additional or alternative steps may be employed.

When an element or layer is referred to as being "on," "engaged to," "connected to," or "coupled to" another element or layer, it may be directly on, engaged, connected or coupled to the other element or layer, or intervening elements or layers may be present. In contrast, when an element is referred to as being "directly on," "directly engaged to," "directly connected to," or "directly coupled to" another element or layer, there may be no intervening elements or layers present. Other words used to describe the relationship between elements should be interpreted in a like fashion (e.g., "between" versus "directly between," "adjacent" versus "directly adjacent," etc.). As used herein, the term "and/or" includes any and all combinations of one or more of the associated listed items.

Although the terms first, second, third, etc. may be used herein to describe various elements, components, regions, layers and/or sections, these elements, components, regions, layers and/or sections should not be limited by these terms. These terms may be only used to distinguish one element, component, region, layer or section from another region, layer or section. Terms such as "first," "second," and other numerical terms when used herein do not imply a sequence or order unless clearly indicated by the context. Thus, a first element, component, region, layer or section discussed below could be termed a second element, component, region, layer or section without departing from the teachings of the example embodiments.

Spatially relative terms, such as "inner," "outer," "beneath," "below," "lower," "above," "upper," and the like, may be used herein for ease of description to describe one element or feature's relationship to another element(s) or feature(s) as illustrated in the figures. Spatially relative terms may be intended to encompass different orientations of the device in use or operation in addition to the orientation depicted in the figures. For example, if the device in the figures is turned over, elements described as "below" or "beneath" other elements or features would then be oriented "above" the other elements or features. Thus, the example term "below" can encompass both an orientation of above and below. The device may be otherwise oriented (rotated 90 degrees or at other orientations) and the spatially relative descriptors used herein interpreted accordingly.

With reference to FIG. 1, a suspension system 100 including a front left damper 102a, a front right damper 102b, a back left damper 102c, and a back right damper 102d. While it should be appreciated that the suspension system 100 described herein may include a different number of dampers than those shown in the drawings, in most automotive applications, four dampers are used at each corner of a vehicle to control vertical movements of the front and rear wheels of the vehicle. Thus, the front left damper 102a controls (e.g., dampens) up and down (i.e., vertical) movements of the front left wheel of the vehicle, the front right damper 102b controls (e.g., dampens) up and down (i.e., vertical) movements of the front right wheel of the vehicle, the back left damper 102c controls (e.g., dampens) up and down (i.e., vertical) movements of the back left wheel of the vehicle, and the back right damper 102d controls (e.g., dampens) up and down (i.e., vertical) movements of the back right wheel of the vehicle.

The suspension system 100 also includes a manifold assembly 104 that is connected in fluid communication with a pump assembly 106 by a pump hydraulic line 108. Although other configurations are possible, in the illustrated example, the pump assembly 106 includes a bi-directional pump 110, a hydraulic reservoir 112 (e.g., a tank), and a bypass hydraulic line 114 that can be open and closed by a pressure relief valve 116. The bi-directional pump 110 includes a first inlet/outlet port that is connected to the pump hydraulic line 108 and a second inlet/outlet port that is connected in fluid communication with the hydraulic reservoir 112 by a reservoir hydraulic line 118. The bi-directional pump 110 may operate (i.e., pump fluid) in two opposite directions depending on the polarity of the electricity that is supplied to the pump 110, so the first inlet/outlet port may operate as either an inlet port or an outlet port depending on the direction the bi-directional pump 110 is operating in and the same is true for the second inlet/outlet port of the bi-directional pump 110. In the example where the first inlet/outlet port is operating as an inlet port for the bi-directional pump 110 and the second inlet/outlet port is operating as an outlet port for the bi-directional pump 110, the bi-directional pump 110 draws in hydraulic fluid from the pump hydraulic line 108 via the first inlet/outlet port and discharges hydraulic fluid into the reservoir hydraulic line 118 via the second inlet/outlet port. As such, the bi-directional pump 110 produces a negative pressure in the pump hydraulic line 108 that can be used by manifold assembly 104 to reduced fluid pressure in the suspension system 100. In the example where the second inlet/outlet port is operating as an inlet port for the bi-directional pump 110 and the first inlet/outlet port is operating as an outlet port for the bi-directional pump 110, the bi-directional pump 110 draws in hydraulic fluid from the reservoir hydraulic line 118 via the second inlet/outlet port and discharges hydraulic fluid into the pump hydraulic line 108 via the first inlet/outlet port. As such, the bi-directional pump 110 produces a positive pressure in the pump hydraulic line 108 that can be used by manifold assembly 104 to increase fluid pressure in the suspension system 100. The bypass hydraulic line 114 runs from the pump hydraulic line 108 to the hydraulic reservoir 112 and bleeds fluid back into the hydraulic reservoir 112 when the pressure in the pump hydraulic line 108 exceeds a threshold pressure that causes the pressure relief valve 116 to open.

The manifold assembly 104 is connected in fluid communication with the front and rear dampers 102a, 102b, 102c, 102d by first and second hydraulic circuits 120a, 120b. The manifold assembly 104 includes first and second manifold valves 122a, 122b that are connected in parallel with the pump hydraulic line 108. The first hydraulic circuit 120a is connected in fluid communication with the first manifold valve 122a and the second hydraulic circuit 120b is connected in fluid communication with the second manifold valve 122b. The manifold assembly 104 also includes a first pressure sensor 124a that is arranged to monitor the pressure in the first hydraulic circuit 120a and a second pressure sensor 124b that is arranged to monitor the pressure in the second hydraulic circuit 120b. The bi-directional pump 110 of the pump assembly 106 and first and second pressure sensors 124a, 124b and the first and second manifold valves 122a, 122b of the manifold assembly 104 are electrically connected to a controller (not shown), which is configured to activate (i.e., turn on in forward or reverse) the bi-directional pump 110 and electronically actuate (i.e., open and close) the first and second manifold valves 122a, 122b in response to various inputs, including signals from the first and second pressure sensors 124a, 124b. When the controller opens the first and second manifold valves 122a, 122b, the fluid pressure in the first and second hydraulic circuits 120a, 120b increases or decreases depending on which direction the bi-directional pump 110 is running in.

The anti-roll capabilities of the suspension system 100 will be explained in greater detail below; however, from FIG. 1 it should be appreciated that fluid pressure in the first and second hydraulic circuits 120a, 120b operate to dynamically adjust the roll stiffness of the vehicle and can be used to either augment or completely replace mechanical stabilizer bars/anti-roll bars. Such mechanical systems require relatively straight, unobstructed runs between each of the front dampers 102a, 102b and each of the back dampers 102c, 102d. Accordingly, the suspension system 100 disclosed herein offers packaging benefits because the dampers 102a, 102b, 102c, 102d only need to be hydraulically connected to the manifold assembly 104.

Each of the dampers 102a, 102b, 102c, 102d of the suspension system 100 includes a damper housing, a piston rod, and a piston that is mounted on the piston rod. The piston is arranged in sliding engagement with the inside of the damper housing such that the piston divides the damper housing into compression and rebound chambers. As such, the front left damper 102a includes a first compression chamber 126a and a first rebound chamber 128a, the front right damper 102b includes a second compression chamber 126b and a second rebound chamber 128b, the back left damper 102c includes a third compression chamber 126c and a third rebound chamber 128c, and the back right damper 102d includes a fourth compression chamber 126d and a fourth rebound chamber 128d.

In each damper 102a, 102b, 102c, 102d, the piston is a closed piston with no fluid flow paths defined within or by its structure. In addition, there are no other fluid flow paths in the damper housing such that no fluid is communicated between the compression and rebound chambers of the dampers 102a, 102b, 102c, 102d except through the first and second hydraulic circuits 120a, 120b. The rebound chambers 128a, 128b, 128c, 128d of the dampers 102a, 102b, 102c, 102d decrease in volume during rebound/extension strokes and increase in volume during compression strokes of the dampers 102a, 102b, 102c, 102d. The compression chambers 126a, 126b, 126c, 126d of the dampers 102a, 102b, 102c, 102d decrease in volume during compression strokes of the dampers 102a, 102b, 102c, 102d and increase in volume during rebound/extension strokes of the dampers 102a, 102b, 102c, 102d.

Each damper 102a, 102b, 102c, 102d also includes rebound and compression chamber ports 130a, 130b in the damper housing that are each provided with dampening valves. The rebound chamber port 130a is arranged in fluid communication with the rebound chamber 128a, 128b, 128c, 128d of the damper 102a, 102b, 102c, 102d and the second port 130b is arranged in fluid communication with the compression chamber 126a, 126b, 126c, 126d of the damper 102a, 102b, 102c, 102d. The dampening valves in the rebound and compression chamber ports 130a, 130b can be passive/spring-biased valves (e.g., spring-disc stacks) or active valves (e.g., electromechanical valves) and control fluid flow into and out of the compression and rebound chambers of the dampers 102a, 102b, 102c, 102d to provide one or more rebound dampening rates and compression dampening rates for each of the dampers 102a, 102b, 102c, 102d.

The first hydraulic circuit 120a includes a first longitudinal hydraulic line 132a that extends between and fluidly connects the second port 130b (to the first compression chamber 126a) of the front left damper 102a and the second port 130b (to the third compression chamber 126c) of the back left damper 102c. The first hydraulic circuit 120a includes a front hydraulic line 134a that extends between and fluidly connects the first longitudinal hydraulic line 132a and the rebound chamber port 130a (to the second rebound chamber 128b) of the front right damper 102b. The first hydraulic circuit 120a also includes a rear hydraulic line 136a that extends between and fluidly connects the first longitudinal hydraulic line 132a and the rebound chamber port 130a (to the fourth rebound chamber 128d) of the back right damper 102d. The first hydraulic circuit 120a further includes a first manifold hydraulic line 138a that extends between and fluidly connects the first longitudinal hydraulic line 132a and the first manifold valve 122a. The second hydraulic circuit 120b includes a second longitudinal hydraulic line 132b that extends between and fluidly connects the compression chamber port 130b (to the second compression chamber 126b) of the front right damper 102b and the compression chamber port 130b (to the fourth compression chamber 126d) of the back right damper 102d. The second hydraulic circuit 120b includes a front hydraulic line 134b that extends between and fluidly connects the second longitudinal hydraulic line 132b and the rebound chamber port 130a (to the first rebound chamber 128a) of the front left damper 102a. The second hydraulic circuit 120b also includes a rear hydraulic line 136b that extends between and fluidly connects the second longitudinal hydraulic line 132b and the rebound chamber port 130a (to the third rebound chamber 128c) of the back left damper 102c. The second hydraulic circuit 120b further includes a second manifold hydraulic line 138b that extends between and fluidly connects the second longitudinal hydraulic line 132b and the second manifold valve 122b. It should be appreciated that the word "longitudinal" as used in the first and second longitudinal hydraulic lines 132a, 132b simply means that the first and second longitudinal hydraulic lines 132a, 132b run between the front dampers 102a, 102b and the back dampers 102c, 102d generally. The first and second longitudinal hydraulic lines 132a, 132b need not be linear or arranged in any particular direction as long as they ultimately connect the front dampers 102a, 102b and the back dampers 102c, 102d.

The suspension system 100 also includes four bridge hydraulic lines 140a, 140b, 140c, 140d that fluidly couple the first and second hydraulic circuits 120a, 120b and each corner of the vehicle. The four bridge hydraulic lines 140a, 140b, 140c, 140d include a front left bridge hydraulic line 140a that extends between and fluidly connects the first longitudinal hydraulic line 132a of the first hydraulic circuit 120a and the front hydraulic line 134b of the second hydraulic circuit 120b, a front right bridge hydraulic line 140b that extends between and fluidly connects the front hydraulic line 134a of the first hydraulic circuit 120a and the second longitudinal hydraulic line 132b of the second hydraulic circuit 120b, a back left bridge hydraulic line 140c that extends between and fluidly connects the first longitudinal hydraulic line 132a of the first hydraulic circuit 120a and the rear hydraulic line 136b of the second hydraulic circuit 120b, and a back right bridge hydraulic line 140d that extends between and fluidly connects the rear hydraulic line 136a of the first hydraulic circuit 120a and the second longitudinal hydraulic line 132b of the second hydraulic circuit 120b.

The front left bridge hydraulic line 140a is connected to the first longitudinal hydraulic line 132a between the compression chamber port 130b of the front left damper 102a and the front hydraulic line 134a of the first hydraulic circuit 120a. The front right bridge hydraulic line 140b is connected to the second longitudinal hydraulic line 132b between the compression chamber port 130b of the front right damper 102b and the front hydraulic line 134b of the second hydraulic circuit 120b. The back left bridge hydraulic line 140c is connected to the first longitudinal hydraulic line 132a between the compression chamber port 130b of the back left damper 102c and the rear hydraulic line 136a of the first hydraulic circuit 120a. The back right bridge hydraulic line 140d is connected to the second longitudinal hydraulic line 132b between the compression chamber port 130b of the back right damper 102d and the rear hydraulic line 136b of the second hydraulic circuit 120b. In the illustrated example, the various hydraulic lines are made of flexible tubing (e.g., hydraulic hoses), but it should be appreciated that other conduit structures and/or fluid passageways can be used.

A front left accumulator 142a is arranged in fluid communication with the first longitudinal hydraulic line 132a at a location between the compression chamber port 130b of the front left damper 102a and the front left bridge hydraulic line 140a. A front right accumulator 142b is arranged in fluid communication with the second longitudinal hydraulic line 132b at a location between the compression chamber port 130b of the front right damper 102b and the front right bridge hydraulic line 140b. A back left accumulator 142c is arranged in fluid communication with the first longitudinal hydraulic line 132a at a location between the compression chamber port 130b of the back left damper 102c and the back left bridge hydraulic line 140c. A back right accumulator 142d is arranged in fluid communication with the second longitudinal hydraulic line 132b at a location between the compression chamber port 130b of the back right damper 102d and the back right bridge hydraulic line 140d. Each of the accumulators 142a, 142b, 142c, 142d have a variable fluid volume that increases and decreases depending on the fluid pressure in the first and second longitudinal hydraulic lines 132a, 132b. It should be appreciated that the accumulators 142a, 142b, 142c, 142d may be constructed in a number of different ways. For example and without limitation, the accumulators 142a, 142b, 142c, 142d may have accumulation chambers and pressurized gas chambers that are separated by floating pistons or flexible membranes.

The suspension system 100 also includes six electro-mechanical comfort valves 144a, 144b, 144c, 144d, 146a, 146b that are connected in-line (i.e., in series) with each of the bridge hydraulic lines 140a, 140b, 140c, 140d and each of the longitudinal hydraulic lines 132a, 132b. A front left comfort valve 144a is positioned in the front left bridge hydraulic line 140a. A front right comfort valve 144b is positioned in the front right bridge hydraulic line 140b. A back left comfort valve 144c is positioned in the back left bridge hydraulic line 140c. A back right comfort valve 144d is positioned in the back right bridge hydraulic line 140d. A first longitudinal comfort valve 146a is positioned in the first longitudinal hydraulic line 132a between the front and rear hydraulic lines 134a, 136a of the first hydraulic circuit 120a. A second longitudinal comfort valve 146b is positioned in the second longitudinal hydraulic line 132b between the front and rear hydraulic lines 134b, 136b of the second hydraulic circuit 120b. In the illustrated example, the comfort valves 144a, 144b, 144c, 144d and the longitudinal comfort valves 146a, 146b are semi-active electro-mechanical valves with a combination of passive spring-disk elements and a solenoid. The comfort valves 144a, 144b, 144c, 144d and the longitudinal comfort valves 146a, 146b are electronically connected to the controller, which is configured to supply electrical current to the solenoids of the comfort valves 144a, 144b, 144c, 144d and the longitudinal comfort valves 146a, 146b to selectively and individually open and close the comfort valves 144a, 144b, 144c, 144d and the longitudinal comfort valves 146a, 146b.

The first pressure sensor 124a of the manifold assembly 104 is arranged to measure fluid pressure in the first manifold hydraulic line 138a and the second pressure sensor 124b of the manifold assembly 104 is arranged to measure fluid pressure in the second manifold hydraulic line 138b. When the vehicle is cornering, braking, or accelerating, the lateral and longitudinal acceleration is measured by one or more accelerometers (not shown) and the anti-roll torque to control the roll of the vehicle is calculated by the controller. Alternatively, the lateral and longitudinal acceleration of the vehicle can be computed by the controller based on a variety of different inputs, including without limitation, steering angle, vehicle speed, brake pedal position, and/or accelerator pedal position. The dampers 102a, 102b, 102c, 102d are used to provide forces that counteract the roll moment induced by the lateral acceleration, thus reducing the roll angle of the vehicle.

When the first and second manifold valves 122a, 122b are closed, the first and second hydraulic circuits 120a, 120b operate as a closed loop system, either together or separately depending on the open or closed status of the electro-mechanical comfort valves 144a, 144b, 144c, 144d and the longitudinal comfort valves 146a, 146b. When the first and/or second manifold valves 122a, 122b are open, the bi-directional pump 110 either adds or removes fluid from the first and/or second hydraulic circuits 120a, 120b. As will be explained in greater detail below, the suspension system 100 can control the roll stiffness of the vehicle, which changes the degree to which the vehicle will lean to one side or the other during cornering (i.e., roll)

For example, when the vehicle is put into a right-hand turn, the momentum of the sprung weight of the vehicle tends to make the vehicle lean left towards the outside of the turn, compressing the front left damper 102a and the back left damper 102c. When this occurs, fluid flows out from the first compression chamber 126a of the front left damper 102a and the third compression chamber 126c of the back left damper 102c into the first longitudinal hydraulic line 132a of the first hydraulic circuit 120a. As a result of the weight transfer to the left side of the vehicle, the front right damper 102b and back right damper 102d begin to extend, causing fluid to flow out of the second rebound chamber 128b of the front right damper 102b and the fourth compression chamber 126d of the back right damper 102d into the front and rear hydraulic lines 134a, 136a of the first hydraulic circuit 120a. When the comfort valves 144a, 144b, 144c, 144d are closed, the fluid flow out of the first compression chamber 126a of the front left damper 102a, out of the third compression chamber 126c of the back left damper 102c, out of the second rebound chamber 128b of the front right damper 102b, and out of the fourth rebound chamber 128d of the back right damper 102d and into the front and rear hydraulic lines 134a, 136a of the first hydraulic circuit 120a increases the pressure in the front left and back left accumulators 142a, 142c, thus providing a passive roll resistance where it becomes increasingly more difficult to compress the front left damper 102a and the back left damper 102c since the first compression chamber 126a of the front left damper 102a and the third compression chamber 126c of the back left damper 102c are connected in fluid communication with the first hydraulic circuit 120a. At the same time, fluid flows out of front right and back right accumulators 142b, 142d and into the first rebound chamber 128a of the front left damper 102a, into the third rebound chamber 128c of the back left damper 102c, into the second compression chamber 126b of the front right damper 102b, and into the fourth compression chamber 126d of the back right damper 102d. The resulting pressure difference between the dampers 102a, 102b, 102c, 102d generates damper forces that counteract or resist the roll moment of the vehicle. Additional roll resistance can be added by opening the first manifold valve 122a as the bi-directional pump 110 is running in a first direction where the bi-directional pump 110 draws in hydraulic fluid from the reservoir hydraulic line 118 and discharges hydraulic fluid into the pump hydraulic line 108 to produce a positive pressure in the pump hydraulic line 108, which increases fluid pressure in the first hydraulic circuit 120a when the first manifold valve 122a is open.

The opposite is true when the vehicle is put into a left-hand turn, where the momentum of the sprung weight of the vehicle tends to make the vehicle lean right towards the outside of the turn, compressing the front right damper 102b and the back right damper 102d. When this occurs, fluid flows out from the second compression chamber 126b of the front right damper 102b and the fourth compression chamber 126d of the back right damper 102d into the second longitudinal hydraulic line 132b of the second hydraulic circuit 120b. As a result of the weight transfer to the right side of the vehicle, the front left damper 102a and back left damper 102c begin to extend, causing fluid to flow out of the first rebound chamber 128a of the front left damper 102a and the third rebound chamber 128c of the back left damper 102c into the front and rear hydraulic lines 134b, 136b of the second hydraulic circuit 120b. When the comfort valves 144a, 144b, 144c, 144d are closed, the fluid flow out of the second compression chamber 126b of the front right damper 102b, out of the fourth compression chamber 126d of the back right damper 102d, out of the first rebound chamber 128a of the front left damper 102a, and out of the third rebound chamber 128c of the back left damper 102c and into the front and rear hydraulic lines 134b, 136b of the second hydraulic circuit 120b increases the pressure in the front right and back right accumulators 142b, 142d, thus providing a passive roll resistance where it becomes increasingly more difficult to compress the front right damper 102b and the back right damper 102d since the second compression chamber 126b of the front right damper 102b and the fourth compression chamber 126d of the back right damper 102d are connected in fluid communication with the second hydraulic circuit 120b. At the same time, fluid flows out of front left and back left accumulators 142a, 142c and into the second rebound chamber 128b of the front right damper 102b, into the fourth rebound chamber 128d of the back right damper 102d, into the first compression chamber 126a of the front left damper 102a, and into the third compression chamber 126c of the back left damper 102c. The resulting pressure difference between the dampers 102a, 102b, 102c, 102d generates damper forces that counteract or resist the roll moment of the vehicle. Additional roll resistance can be added by opening the second manifold valve 122b as the bi-directional pump 110 is running in the first direction where the bi-directional pump 110 draws in hydraulic fluid from the reservoir hydraulic line 118 and discharges hydraulic fluid into the pump hydraulic line 108 to produce a positive pressure in the pump hydraulic line 108, which increases fluid pressure in the second hydraulic circuit 120b when the second manifold valve 122b is open.

It should also be appreciated that during cornering, the roll stiffness of the front dampers 102a, 102b can be coupled or de-coupled from the roll stiffness of the rear dampers 102c, 102d by opening and closing the first and/or second longitudinal comfort valves 146a, 146b. For example, the roll stiffness of the front left damper 102a and the back left damper 102c will be coupled when the first longitudinal comfort valve 146a is open and decoupled when the first longitudinal comfort valve 146a is closed. Similarly, the roll stiffness of the front right damper 102b and the back right damper 102d will be coupled when the second longitudinal comfort valve 146b is open and decoupled when the second longitudinal comfort valve 146b is closed.

When roll stiffness is not required, the comfort valves 144a, 144b, 144c, 144d and the longitudinal comfort valves 146a, 146b can be opened to enhance the ride comfort of the suspension system 100 and reduce or eliminate unwanted suspension movements resulting from the hydraulic coupling of one damper of the system to another damper of the system (e.g., where the compression of one damper causes movement and/or a dampening change in another damper). For example, when the front left comfort valve 144a is open and the front left damper 102a undergoes a compression stroke as the front left wheel hits a bump, fluid may flow from the first compression chamber 126a of the front left damper 102a, into the first longitudinal hydraulic line 132a, from the first longitudinal hydraulic line 132a to the front hydraulic line 134b of the second hydraulic circuit 120b by passing through the front left bridge hydraulic line 140a and the front left comfort valve 144a, and into the first rebound chamber 128a of the front left damper 102a. Thus, fluid can travel from the first compression chamber 126a to the first rebound chamber 128a of the front left damper 102a with the only restriction coming from the dampening valves in the rebound and compression chamber ports 130a, 130b of the front left damper 102a. As such, when all of the comfort valves 144a, 144b, 144c, 144d and the longitudinal comfort valves 146a, 146b are open, the dampers 102a, 102b, 102c, 102d are effectively decoupled from one another for improved ride comfort. It should also be appreciated that to return the suspension system 100 to this "comfort mode" of operation, the first and/or second manifold valves 122a, 122b may be opened while the bi-directional pump 110 is running in a second direction where the bi-directional pump 110 draws in hydraulic fluid from the pump hydraulic line 108 and discharges hydraulic fluid into the reservoir hydraulic line 118 to produce a negative pressure in the pump hydraulic line 108 that reduces fluid pressure in the first and/or second hydraulic circuits 120a, 120b.

Figure 2:
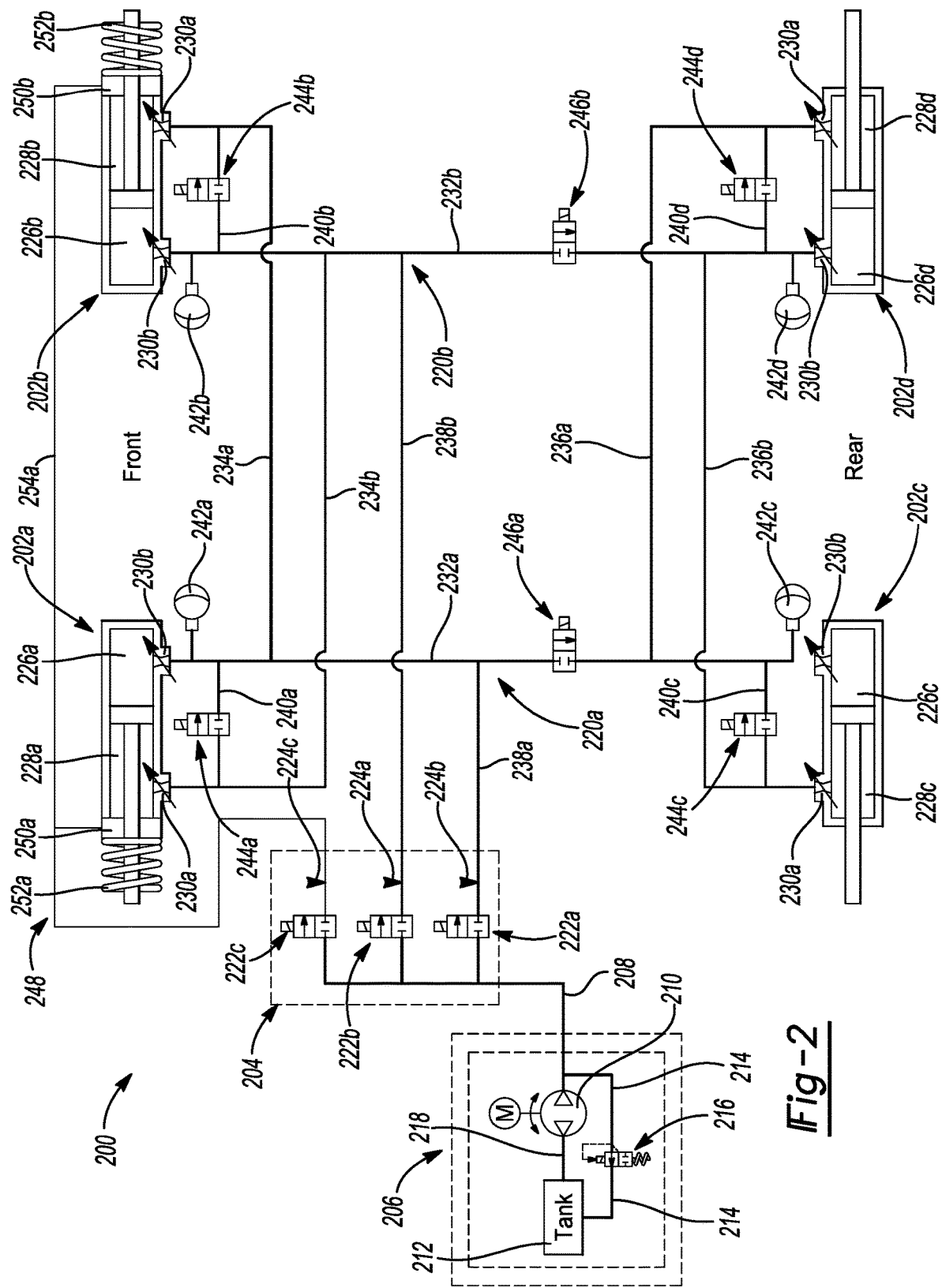
FIG. 2 is a schematic diagram illustrating another exemplary suspension system of the present disclosure that includes two comfort valves that open and close the hydraulic lines connecting the two front dampers to the two rear dampers of the system and a separate hydraulic lifting circuit for the two front dampers.

FIG. 2 illustrates another suspension system 200 that shares many of the same components as the suspension system 100 illustrated in FIG. 1, but in FIG. 2 a front axle lift assembly 248 has been added. Rather than repeat the description set forth above, the following paragraphs describe the structure and function of the components in FIG. 2 that are new and/or different from those shown and described in connection with FIG. 1. It should be appreciated that the reference numbers in FIG. 1 are "100" series numbers (e.g., 100, 102, 104, etc.) whereas the components in FIG. 2 that are the same or similar to the components of the suspension system 100 shown in FIG. 1 share the same base reference numbers, but are listed as "200" series numbers (e.g., 200, 202, 204, etc.). Thus, the same description for element 100 above applies to element 200 in FIG. 2 and so on and so forth.

The front axle lift assembly 248 illustrated in FIG. 2 includes a front left lifter 250a on the front left damper 202a and a front right lifter 250b on the front right damper 202b. Although other configurations are possible, in the illustrated example, the front left damper 202a and the front right damper 202b include a front left coil spring 252a and a front right coil spring 252b, respectively, that extend co-axially and helically about the piston rods of the front dampers 202a, 202b in a coil-over arrangement. The front lifters 250a, 250b are positioned between the front coils springs 252a, 252b and the first and second rebound chambers 228a, 228b of the front dampers 202a, 202b and extend co-axially and annularly about the piston rods. The manifold assembly 204 further includes a third manifold valve 222c that is connected in fluid communication with the pump hydraulic line 208. A front axle lift hydraulic line 254a extends between and is fluidly connected to the third manifold valve 222c with the front left lifter 250a and the front right lifter 250b. A third pressure sensor 224c is arranged to monitor the fluid pressure in the front axle lift hydraulic line 254a. Each front lifter 250a, 250b is axially expandable such that an increase in fluid pressure inside the front lifters 250a, 250b causes the front lifters 250a, 250b to urge the front coil springs 252a, 252b away from the first and second rebound chambers 228a, 228b of the front dampers 202a, 202b, which operates to lift (i.e., raise) the front of the vehicle, increasing the ride height. To activate the front axle lift assembly 248, the controller opens the third manifold valve 222c when the bi-directional pump 210 is running in the first direction where the bi-directional pump 210 draws in hydraulic fluid from the reservoir hydraulic line 218 and discharges hydraulic fluid into the pump hydraulic line 208 to produce a positive pressure in the pump hydraulic line 208, which increases fluid pressure in the front axle lift hydraulic line 254a and thus the front lifters 250a, 250b. Once a desired lift position is achieved, the controller closes the third manifold valve 222c. It should therefore be appreciated that the front axle lift assembly 248 can be used to provide improved ground clearance during off-road operation or to give low riding vehicles improved ground clearance when traversing speed bumps. To deactivate the front axle lift assembly 248, the controller opens the third manifold valve 222c when the bi-directional pump 210 is running in the second direction where the bi-directional pump 210 draws in hydraulic fluid from the pump hydraulic line 208 and discharges hydraulic fluid into the reservoir hydraulic line 218 to produce a negative pressure in the pump hydraulic line 208 that reduces fluid pressure in the front axle lift hydraulic line 254a to lower the front of the vehicle back down to an unlifted position.

Figure 3:
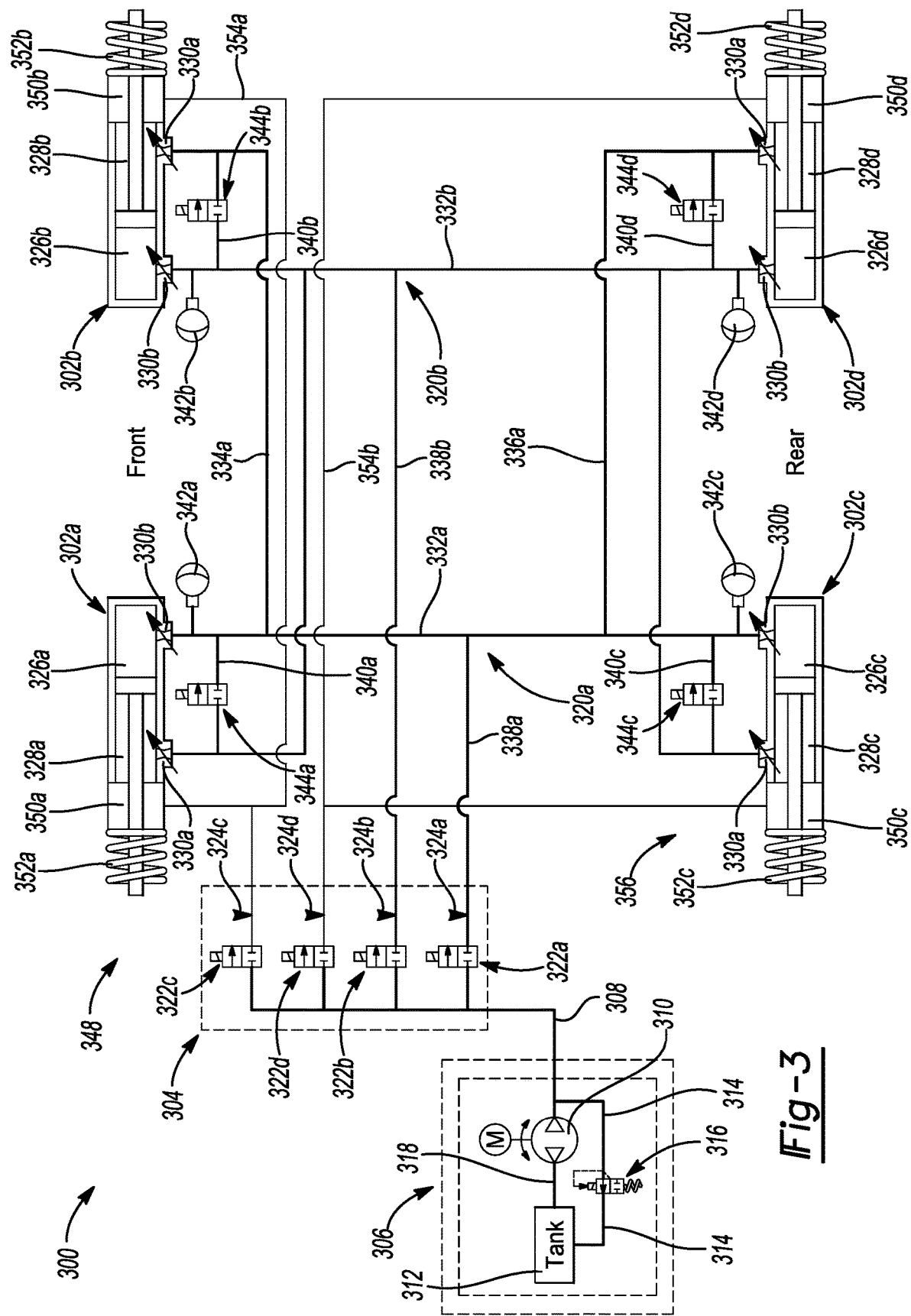
FIG. 3 is a schematic diagram illustrating another exemplary suspension system of the present disclosure that includes two comfort valves that open and close the hydraulic lines connecting the two front dampers to the two rear dampers of the system and two separate hydraulic lifting circuits for the two front dampers and the two rear dampers.

FIG. 3 illustrates another suspension system 300 that shares many of the same components as the suspension systems 100, 200 illustrated in FIGS. 1 and 2, but in FIG. 3 a rear axle lift assembly 356 has been added. Rather than repeat the description set forth above, the following paragraphs describe the structure and function of the components in FIG. 3 that are new and/or different from those shown and described in connection with FIGS. 1 and 2. It should be appreciated that the reference numbers in FIG. 1 are "100" series numbers (e.g., 100, 102, 104, etc.) and the reference numbers in FIG. 2 are "200" series numbers (e.g., 200, 202, 204, etc.) whereas the components in FIG. 3 that are the same or similar to the components of the suspension systems 100, 200 shown in FIGS. 1 and 2 share the same base reference numbers, but are listed as "300" series numbers (e.g., 300, 302, 304, etc.). Thus, the same description for elements 100 and 200 above applies to element 300 in FIG. 3 and so on and so forth.

The rear axle lift assembly 356 illustrated in FIG. 3 includes a back left lifter 350c on the back left damper 302c and a back right lifter 350d on the back right damper 302d. Although other configurations are possible, in the illustrated example, the back left damper 302c and the back right damper 302d include a back left coil spring 352c and a back right coil spring 352d, respectively, that extend co-axially and helically about the piston rods of the back dampers 302c, 302d in a coil-over arrangement. The back lifters 350c, 350d are positioned between the back coils springs 352c, 352d and the third and fourth rebound chambers 328c, 328d of the back dampers 302a, 302b and extend co-axially and annularly about the piston rods. The manifold assembly 304 further includes a fourth manifold valve 322d that is connected in fluid communication with the pump hydraulic line 308. A rear axle lift hydraulic line 354b extends between and is fluidly connected to the fourth manifold valve 322d with the back left lifter 350c and the back right lifter 350d. A fourth pressure sensor 324d is arranged to monitor the fluid pressure in the rear axle lift hydraulic line 354b. Each back lifter 350c, 350d is axially expandable such that an increase in fluid pressure inside the back lifters 350c, 350d causes the back lifters 350c, 350d to urge the back coil springs 352c, 352d away from the third and fourth rebound chambers 328c, 328d of the back dampers 302c, 302d, which operates to lift (i.e., raise) the back/rear of the vehicle, increasing the ride height. To activate the rear axle lift assembly 356, the controller opens the fourth manifold valve 322d when the bi-directional pump 310 is running in the first direction where the bi-directional pump 310 draws in hydraulic fluid from the reservoir hydraulic line 318 and discharges hydraulic fluid into the pump hydraulic line 308 to produce a positive pressure in the pump hydraulic line 308, which increases fluid pressure in the rear axle lift hydraulic line 354b and thus the back lifters 350c, 350d. Once a desired lift position is achieved, the controller closes the fourth manifold valve 322d. It should therefore be appreciated that the rear axle lift assembly 356 can be used in combination with the front axle lift assembly 348 (also described above in connection with FIG. 2) to provide improved ground clearance during off-road operation or to give low riding vehicles improved ground clearance when traversing speed bumps. To deactivate the rear axle lift assembly 356, the controller opens the fourth manifold valve 322D when the bi-directional pump 310 is running in the second direction where the bi-directional pump 310 draws in hydraulic fluid from the pump hydraulic line 308 and discharges hydraulic fluid into the reservoir hydraulic line 318 to produces a negative pressure in the pump hydraulic line 308 that reduces fluid pressure in the rear axle lift hydraulic line 354b to lower the rear of the vehicle back down to an unlifted position.

Figure 4:
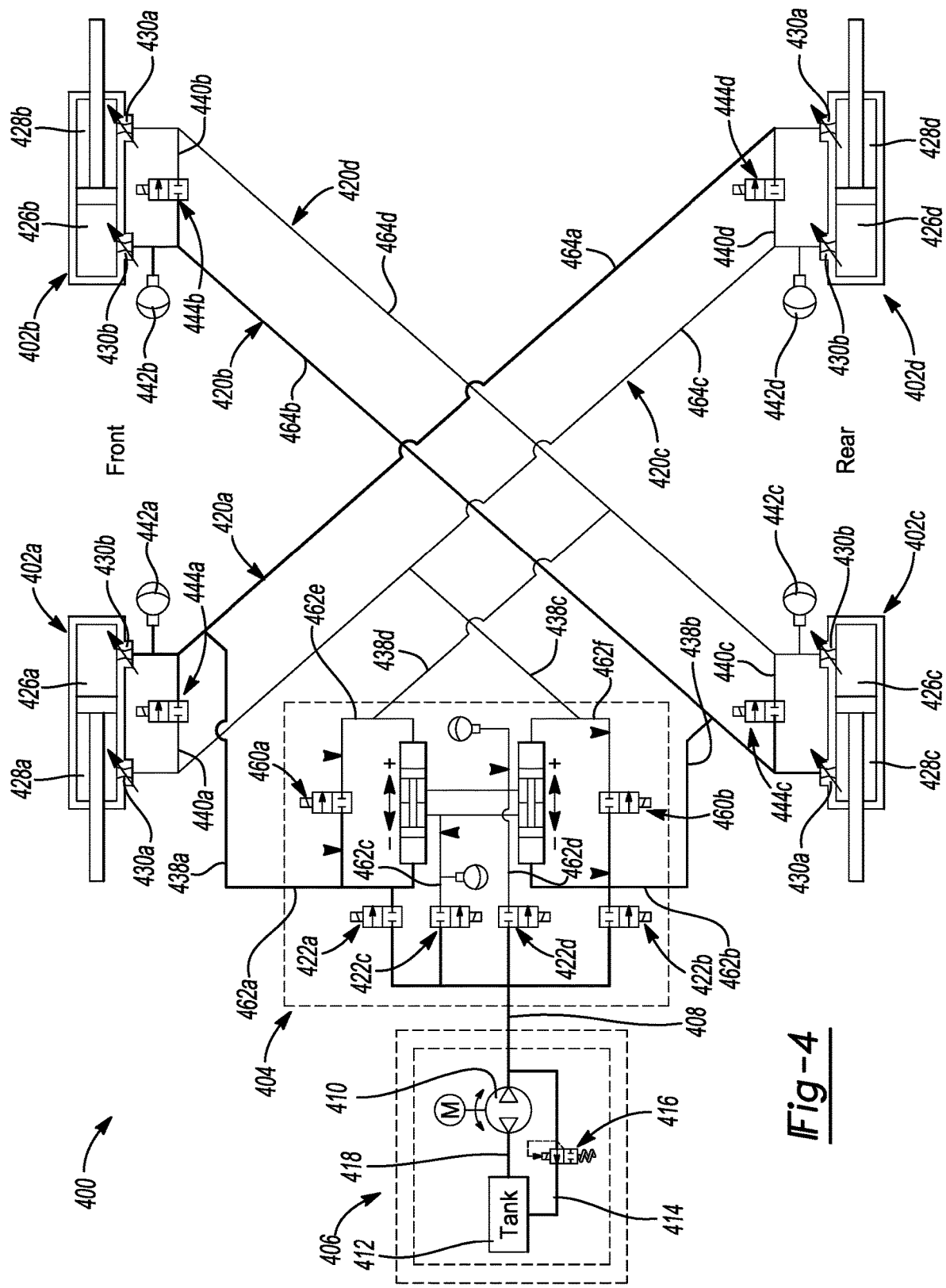
FIG. 4 is a schematic diagram illustrating another exemplary suspension system of the present disclosure that includes four hydraulic circuits connecting the front and rear dampers and an exemplary comfort valve equipped manifold assembly.

With reference to FIG. 4, another suspension system 400 is illustrated that shares many of the same components as the suspension system 100 illustrated in FIG. 1. Rather than repeat the description set forth above, the following paragraphs describe the structure and function of the components in FIG. 4 that are new and/or different from those shown and described in connection with FIG. 1. It should be appreciated that the reference numbers in FIG. 1 are "100" series numbers (e.g., 100, 102, 104, etc.) whereas the components in FIG. 4 that are the same or similar to the components of the suspension system 100 shown in FIG. 1 share the same base reference numbers, but are listed as "400" series numbers (e.g., 400, 402, 404, etc.). Thus, the same description for element 100 above applies to element 400 in FIG. 4 and so on and so forth.

The suspension system 400 in FIG. 4 also includes a front left damper 402a, a front right damper 402b, a back left damper 402c, and a back right damper 402d. The suspension system 400 also includes a manifold assembly 404 that is connected in fluid communication with a pump assembly 406 by a pump hydraulic line 408 Like in FIG. 1, the pump assembly 406 includes a bi-directional pump 410, a hydraulic reservoir 412 (e.g., a tank), and a bypass hydraulic line 414 that can be open and closed by a pressure relief valve 416.

The manifold assembly 404 is connected in fluid communication with the front and rear dampers 402a, 402b, 402c, 402d by four hydraulic circuits 420a, 420b, 420c, 420d: a first hydraulic circuit 420a, a second hydraulic circuit 420b, a third hydraulic circuit 420c, and a fourth hydraulic circuit 420d. The manifold assembly 404 includes four manifold valves 422a, 422b, 422c, 422d (a first manifold valve 422a, a second manifold valve 422b, a third manifold valve 422c, and a fourth manifold valve 422d) that are connected in parallel with the pump hydraulic line 408. The manifold assembly 404 further includes a first manifold comfort valve 460a, a second manifold comfort valve 460b, and six manifold conduits 462a, 462b, 462c, 462d, 462e, 462f: a first manifold conduit 462a, a second manifold conduit 462b, a third manifold conduit 462c, a fourth manifold conduit 462d, a fifth manifold conduit 462e, and a sixth manifold conduit 462f. The first manifold conduit 462a is connected in fluid communication with the first manifold valve 422a and the first manifold comfort valve 460a while the second manifold conduit 462b is connected in fluid communication with the second manifold valve 422b and the second manifold comfort valve 460b. The third manifold conduit 462c is connected in fluid communication with the third manifold valve 422c and the fourth manifold conduit 462d is connected in fluid communication with the fourth manifold valve 422d. The fifth manifold conduit 462e is connected in fluid communication with the first manifold comfort valve 460a and the sixth manifold conduit 462f is connected in fluid communication with the second manifold comfort valve 460b. Additional structure and operational details of the manifold assembly 404 is described below in connection with FIG. 5; however, it should be appreciated from FIG. 4 that fluid pressure in the four hydraulic circuits 420a, 420b, 420c, 420d operates to dynamically adjust the roll and pitch stiffness of the vehicle and can be used to either augment or completely replace mechanical stabilizer bars/anti-roll bars. Such mechanical systems require relatively straight, unobstructed runs between each of the front dampers 402a, 402b and each of the back dampers 402c, 402d. Accordingly, the suspension system 400 disclosed herein offers packaging benefits because the dampers 402a, 402b, 402c, 402d only need to be hydraulically connected to the manifold assembly 404.

The first hydraulic circuit 420a includes a first cross-over hydraulic line 464a that extends between and fluidly connects the compression chamber port 430b (to the first compression chamber 426a) of the front left damper 402a and the rebound chamber port 430a (to the fourth rebound chamber 428d) of the back right damper 402d. The first hydraulic circuit 420a also includes a first manifold hydraulic line 438a that extends between and fluidly connects the first cross-over hydraulic line 464a and the first manifold conduit 462a. The second hydraulic circuit 420b includes a second cross-over hydraulic line 464b that extends between and fluidly connects the compression chamber port 430b (to the second compression chamber 426b) of the front right damper 402b and the rebound chamber port 430a (to the third rebound chamber 428c) of the back left damper 402c. The second hydraulic circuit 420b also includes a second manifold hydraulic line 438b that extends between and fluidly connects the second cross-over hydraulic line 464b and the second manifold conduit 462b. The third hydraulic circuit 420c includes a third cross-over hydraulic line 464c that extends between and fluidly connects the rebound chamber port 430a (to the first rebound chamber 428a) of the front left damper 402a and the compression chamber port 430b (to the fourth compression chamber 426d) of the back right damper 402d. The third hydraulic circuit 420c also includes a third manifold hydraulic line 438c that extends between and fluidly connects the third cross-over hydraulic line 464c and the sixth manifold conduit 462f. The fourth hydraulic circuit 420d includes a fourth cross-over hydraulic line 464d that extends between and fluidly connects the rebound chamber port 430a (to the second rebound chamber 428b) of the front right damper 402b and the compression chamber port 430b (to the third compression chamber 426c) of the back left damper 402c. The fourth hydraulic circuit 420d also includes a fourth manifold hydraulic line 438d that extends between and fluidly connects the fourth cross-over hydraulic line 464d and the fifth manifold conduit 462e. It should be appreciated that the word "cross-over" as used in the first, second, third, and fourth cross-over hydraulic lines 464a, 464b, 464c, 464d simply means that the first, second, third, and fourth cross-over hydraulic lines 464a, 464b, 464c, 464d run between dampers 402a, 402b, 402c, 402d at opposite corners of the vehicle (e.g., front left to back right and front right to back left). The first, second, third, and fourth cross-over hydraulic lines 464a, 464b, 464c, 464d need not be linear or arranged in any particular direction as long as they ultimately connect dampers 402a, 402b, 402c, 402d positioned at opposite corners of the vehicle.

The suspension system 400 also includes four bridge hydraulic lines 440a, 440b, 440c, 440d that fluidly couple the first and third hydraulic circuits 420a, 420c and the second and fourth hydraulic circuits 420b, 420d to one another. The four bridge hydraulic lines 440a, 440b, 440c, 440d include a front left bridge hydraulic line 440a that extends between and fluidly connects the first cross-over hydraulic line 464a and the third cross-over hydraulic line 464c, a front right bridge hydraulic line 440b that extends between and fluidly connects the second cross-over hydraulic line 464b and the fourth cross-over hydraulic line 464d, a back left bridge hydraulic line 440c that extends between and fluidly connects the second cross-over hydraulic line 464b and the fourth cross-over hydraulic line 464d, and a back right bridge hydraulic line 440d that extends between and fluidly connects the first cross-over hydraulic line 464a and the third cross-over hydraulic line 464c.

The front left bridge hydraulic line 440a is connected to the first cross-over hydraulic line 464a between the compression chamber port 430b of the front left damper 402a and the first manifold hydraulic line 438a and is connected to the third cross-over hydraulic line 464c between the rebound chamber port 430a of the front left damper 402a and the third manifold hydraulic line 438c. The front right bridge hydraulic line 440b is connected to the second cross-over hydraulic line 464b between the compression chamber port 430b of the front right damper 402b and the second manifold hydraulic line 438b and is connected to the fourth cross-over hydraulic line 464d between the rebound chamber port 430a of the front right damper 402b and the fourth manifold hydraulic line 438d. The back left bridge hydraulic line 440c is connected to the second cross-over hydraulic line 464b between the rebound chamber port 430a of the back left damper 402c and the second manifold hydraulic line 438b and is connected to the fourth cross-over hydraulic line 464d between the compression chamber port 430b of the back left damper 402c and the fourth manifold hydraulic line 438d. The back right bridge hydraulic line 440d is connected to the first cross-over hydraulic line 464a between the rebound chamber port 430a of the back right damper 402d and the first manifold hydraulic line 438a and is connected to the third cross-over hydraulic line 464c between the compression chamber port 430b of the back right damper 402d and the third manifold hydraulic line 438c. In the illustrated example, the various hydraulic lines are made of flexible tubing (e.g., hydraulic hoses), but it should be appreciated that other conduit structures and/or fluid passageways can be used.

A front left accumulator 442a is arranged in fluid communication with the first cross-over hydraulic line 464a at a location between the compression chamber port 430b of the front left damper 402a and the front left bridge hydraulic line 440a. A front right accumulator 442b is arranged in fluid communication with the second cross-over hydraulic line 464b at a location between the compression chamber port 430b of the front right damper 402b and the front right bridge hydraulic line 440b. A back left accumulator 442c is arranged in fluid communication with the fourth cross-over hydraulic line 464d at a location between the compression chamber port 430b of the back left damper 402c and the back left bridge hydraulic circuit 420c. A back right accumulator 442d is arranged in fluid communication with the third cross-over hydraulic line 464c at a location between the compression chamber port 430b of the back right damper 402d and the back right bridge hydraulic line 440d. Each of the accumulators 442a, 442b, 442c, 442d have a variable fluid volume that increases and decreases depending on the fluid pressure in the first and second longitudinal hydraulic lines 432a, 432b. It should be appreciated that the accumulators 442a, 442b, 442c, 442d may be constructed in a number of different ways. For example and without limitation, the accumulators 442a, 442b, 442c, 442d may have accumulation chambers and pressurized gas chambers that are separated by floating pistons or flexible membranes.

The suspension system 400 also includes four electro-mechanical comfort valves 444a, 444b, 444c, 444d that are connected in-line (i.e., in series) with each of the bridge hydraulic lines 440a, 440b, 440c, 440d. A front left comfort valve 444a is positioned in the front left bridge hydraulic line 440a. A front right comfort valve 444b is positioned in the front right bridge hydraulic line 440b. A back left comfort valve 444c is positioned in the back left bridge hydraulic line 440c. A back right comfort valve 444d is positioned in the back right bridge hydraulic line 440d. In the illustrated example, the four comfort valves 444a, 444b, 444c, 444d and the two manifold comfort valves 460a, 460b are semi-active electro-mechanical valves with a combination of passive spring-disk elements and a solenoid. The comfort valves 444a, 444b, 444c, 444d and the two manifold comfort valves 460a, 460b are electronically connected to the controller, which is configured to supply electrical current to the solenoids of the comfort valves 444a, 444b, 444c, 444d and the two manifold comfort valves 460a, 460b to selectively and individually open and close the comfort valves 444a, 444b, 444c, 444d and the two manifold comfort valves 460a, 460b.

When the manifold valves 422a, 422b, 422c, 422d are closed, the hydraulic circuits 420a, 420b, 420c, 420d operate as a closed loop system, either together or separately depending on the open or closed status of the comfort valves 444a, 444b, 444c, 444d and manifold comfort valves 460a, 460b. When the manifold valves 422a, 422b, 422c, 422d are open, the bi-directional pump 110 either adds or removes fluid from one or more of the hydraulic circuits 420a, 420b, 420c, 420d. There are three primary types of suspension movements that the illustrated suspension system 400 can control either passively (i.e., as a closed loop system) or actively (i.e., as an open loop system) by changing or adapting the roll and/or pitch stiffness of the vehicle: leaning to one side or the other during cornering (i.e., roll) pitching forward during braking (i.e., brake dive), and pitching aft during acceleration (i.e., rear end squat). Descriptions of how the suspension system 400 reacts to each of these conditions are provided below.

When the vehicle is put into a right-hand turn, the momentum of the sprung weight of the vehicle tends to make the vehicle lean left towards the outside of the turn, compressing the front left damper 402a and the back left damper 402c. When this occurs, fluid flows out from the first compression chamber 426a of the front left damper 402a and the third compression chamber 426c of the back left damper 402c into the first and fourth cross-over hydraulic lines 464a, 464d. As a result of the weight transfer to the left side of the vehicle, the front right damper 402b and back right damper 402d begin to extend, causing fluid to flow out of the second rebound chamber 428b of the front right damper 402b and the fourth rebound chamber 428d of the back right damper 402d into the first and fourth cross-over hydraulic lines 464a, 464d. When the comfort valves 444a, 444b, 444c, 444d are closed, the fluid flow out of the first compression chamber 426a of the front left damper 402a, out of the third compression chamber 426c of the back left damper 402c, out of the second rebound chamber 428b of the front right damper 402b, and out of the fourth rebound chamber 428d of the back right damper 402d and into the first and fourth cross-over hydraulic lines 464a, 464d increases the pressure in the front left and back left accumulators 442a, 442c, thus providing a passive roll resistance where it becomes increasingly more difficult to compress the front left damper 402a and the back left damper 402c since the first compression chamber 426a of the front left damper 402a and the third compression chamber 426c of the back left damper 402c are connected in fluid communication with the first and fourth hydraulic circuits 420a, 420d. At the same time, fluid flows out of front right and back right accumulators 442b, 442d and into the first rebound chamber 428a of the front left damper 402a, into the third rebound chamber 428c of the back left damper 402c, into the second compression chamber 426b of the front right damper 402b, and into the fourth compression chamber 426d of the back right damper 402d. The resulting pressure difference between the dampers 402a, 402b, 402c, 402d generates damper forces that counteract or resist the roll moment of the vehicle. Additional roll resistance can be added by opening the first manifold valve 422a and the first manifold comfort valve 460a as the bi-directional pump 410 is running in a first direction where the bi-directional pump 410 draws in hydraulic fluid from the reservoir hydraulic line 418 and discharges hydraulic fluid into the pump hydraulic line 408 to produce a positive pressure in the pump hydraulic line 408, which increases fluid pressure in the first and fourth hydraulic circuits 420a, 420d.

The opposite is true when the vehicle is put into a left-hand turn, where the momentum of the sprung weight of the vehicle tends to make the vehicle lean right towards the outside of the turn, compressing the front right damper 402b and the back right damper 402d. When this occurs, fluid flows out from the second compression chamber 426b of the front right damper 402b and the fourth compression chamber 426d of the back right damper 402d into the second and third cross-over hydraulic lines 464b, 464c. As a result of the weight transfer to the right side of the vehicle, the front left damper 402a and back left damper 402c begin to extend, causing fluid to flow out of the first rebound chamber 428a of the front left damper 402a and the third rebound chamber 428c of the back left damper 402c into the second and third cross-over hydraulic lines 464b, 464c. When the comfort valves 444a, 444b, 444c, 444d are closed, the fluid flow out of the second compression chamber 426b of the front right damper 402b, out of the fourth compression chamber 426d of the back right damper 402d, out of the first rebound chamber 428a of the front left damper 402a, and out of the third rebound chamber 428c of the back left damper 402c and into the second and third cross-over hydraulic lines 464b, 464c increases the pressure in the front right and back right accumulators 142b, 142d, thus providing a passive roll resistance where it becomes increasingly more difficult to compress the front right damper 402b and the back right damper 402d since the second compression chamber 426b of the front right damper 402b and the fourth compression chamber 426d of the back right damper 402d are connected in fluid communication with the second and third hydraulic circuits 420b, 420c. At the same time, fluid flows out of front left and back left accumulators 442a, 442c and into the second rebound chamber 428b of the front right damper 402b, into the fourth rebound chamber 428d of the back right damper 402d, into the first compression chamber 426a of the front left damper 402a, and into the third compression chamber 426c of the back left damper 402c. The resulting pressure difference between the dampers 402a, 402b, 402c, 402d generates damper forces that counteract or resist the roll moment of the vehicle. Additional roll resistance can be added by opening the second manifold valve 422b and the second manifold comfort valve 460b as the bi-directional pump 410 is running in the first direction where the bi-directional pump 410 draws in hydraulic fluid from the reservoir hydraulic line 418 and discharges hydraulic fluid into the pump hydraulic line 408 to produce a positive pressure in the pump hydraulic line 408, which increases fluid pressure in the second and third hydraulic circuits 420b, 420c.

During braking, the momentum of the sprung weight of the vehicle tends to make the vehicle pitch or dive forward, compressing the front left damper 402a and the front right damper 402b. When this occurs, fluid flows out from the first compression chamber 426a of the front left damper 402a into the first cross-over hydraulic line 464a and out from the second compression chamber 426b of the front right damper 402b into the second cross-over hydraulic line 464b. As a result of the weight transfer to the front of the vehicle, the back left damper 402c and back right damper 402d begin to extend, causing fluid to flow out of the third rebound chamber 428c of the back left damper 402c into the second cross-over hydraulic line 464b and out of the fourth rebound chamber 428d of the back right damper 402d into the first cross-over hydraulic line 464a. With the front left, front right, back left, and back right comfort valves 444a, 444b, 444c, 444d and the first and second manifold comfort valves 460a, 460b all closed, the fluid flow out of the third rebound chamber 428c of the back left damper 402c and the fourth rebound chamber 428d of the back right damper 402d into the first and second cross-over hydraulic lines 464a, 464b increases the pressure in the front left and front right accumulators 442a, 442b, thus providing a passive pitch resistance where it becomes increasingly more difficult to compress the front left damper 402a and the front right damper 402b since the first compression chamber 426a of the front left damper 402a and the second compression chamber 426b of the front right damper 402b are connected in fluid communication with the first and second hydraulic circuits 420a, 420b.

During acceleration, the momentum of the sprung weight of the vehicle tends to make the vehicle pitch or squat rearward (i.e., aft), compressing the back left damper 402c and the back right damper 402d. When this occurs, fluid flows out from the third compression chamber 426c of the back left damper 402c into the fourth cross-over hydraulic line 464d and out of the fourth compression chamber 426d of the back right damper 402d into the third cross-over hydraulic line 464c. As a result of the weight transfer to the back/rear of the vehicle, the front left damper 402a and front right damper 402b begin to extend, causing fluid to flow out of the first rebound chamber 428a of the front left damper 402a into the third cross-over hydraulic line 464c and out of the second rebound chamber 428b of the front right damper 402b into the fourth cross-over hydraulic line 464d. With the front left, front right, back left, and back right comfort valves 444a, 444b, 444c, 444d and the first and second manifold comfort valves 460a, 460b all closed, the fluid flow out of the first rebound chamber 428a of the front left damper 402a and the second rebound chamber 428b of the front right damper 402b into the third and fourth cross-over hydraulic lines 464c, 464d increases the pressure in the back left and back right accumulators 442c, 442d, thus providing a passive pitch resistance where it becomes increasingly more difficult to compress the back left damper 402c and the back right damper 402d since the third compression chamber 426c of the back left damper 402c and the fourth compression chamber 426d of the back right damper 402d are connected in fluid communication with the third and fourth hydraulic circuits 420c, 420d.

When active or passive roll and/or pitch stiffness is not required, the four comfort valves 444a, 444b, 444c, 444d and the two manifold comfort valves 460a, 460b can be opened to enhance the ride comfort of the suspension system 400 and reduce or eliminate unwanted suspension movements resulting from the hydraulic coupling of one damper of the system to another damper of the system (e.g., where the compression of one damper causes movement and/or a dampening change in another damper). For example, when the front left comfort valve 444a is open and the front left damper 402a undergoes a compression stroke as the front wheel hits a bump, fluid may flow from the first compression chamber 426a of the front left damper 402a, into the first cross-over hydraulic line 464a, from the first cross-over hydraulic line 464a to the third cross-over hydraulic line 464c by passing through the front left bridge hydraulic line 440a and the front left comfort valve 444a, and into the first rebound chamber 428a of the front left damper 402a. Thus, fluid can travel from the first compression chamber 426a to the first rebound chamber 428a of the front left damper 402a with the only restriction coming from the dampening valves in the rebound and compression chamber ports 430a, 430b of the front left damper 402a. As such, when all of the comfort valves 444a, 444b, 444c, 444d and the manifold comfort valves 460a, 460b are open, the dampers 402a, 402b, 402c, 402d are effectively decoupled from one another for improved ride comfort. It should also be appreciated that to return the suspension system 400 to this "comfort mode" of operation, the manifold valves 422a, 422b, 422c, 422d and/or the manifold comfort valves 460a, 460b may be opened while the bi-directional pump 410 is running in a second direction where the bi-directional pump 410 draws in hydraulic fluid from the pump hydraulic line 408 and discharges hydraulic fluid into the reservoir hydraulic line 418 to produce a negative pressure in the pump hydraulic line 408 that reduces fluid pressure in the hydraulic circuits 420a, 420b, 420c, 420d of the suspension system 400.

Figure 5:
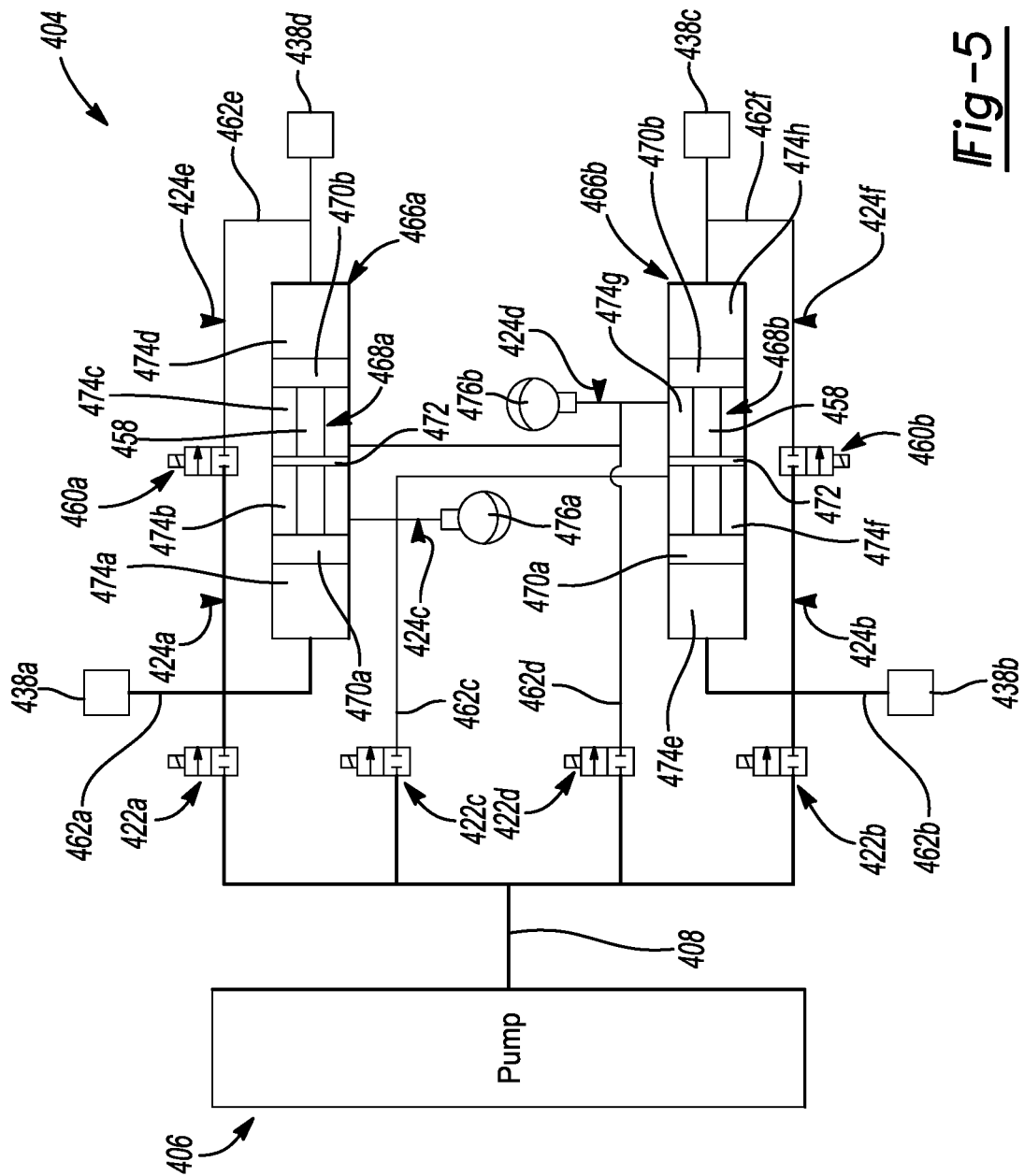
FIG. 5 is a schematic diagram illustrating the exemplary comfort valve equipped manifold assembly illustrated in FIG. 4.

FIG. 5 illustrates the manifold assembly 404 of the suspension system 400 in more detail. The manifold assembly 404 includes first and second piston bores 466a, 466b that slidingly receive first and second floating pistons 468a, 468b, respectively. Each floating piston 468a, 468b includes a piston rod 458 and first and second piston heads 470a, 470b that are fixably coupled to opposing ends of the piston rod 458. A chamber divider 472 is fixably mounted at a midpoint of each of the first and second piston bores 466a, 466b. Each chamber divider 472 includes a through-bore that slidingly receives the piston rod 458. As such, the first piston bore 466a is divided by the first floating piston 468a into a first piston chamber 474a that is arranged in fluid communication with the first manifold conduit 462a, a second piston chamber 474b disposed between the first piston head 470a of the first floating piston 468a and the chamber divider 472 in the first piston bore 466a, a third piston chamber 474c disposed between the second piston head 470b of the first floating piston 468a and the chamber divider 472 in the first piston bore 466a, and a fourth piston chamber 474d that is arranged in fluid communication with the fifth manifold conduit 462e. Similarly, the second piston bore 466b is divided by the second floating piston 468b into a fifth piston chamber 474e that is arranged in fluid communication with the second manifold conduit 462b, a sixth piston chamber 474f disposed between the first piston head 470a of the second floating piston 468b and the chamber divider 472 in the second piston bore 466b, a seventh piston chamber 474g disposed between the second piston head 470b of the second floating piston 468b and the chamber divider 472 in the second piston bore 466b, and an eighth piston chamber 474h that is arranged in fluid communication with the sixth manifold conduit 462f. Optionally, biasing members (e.g., springs) (not shown) may be placed in the second, third, sixth, and seventh piston chambers 474b, 474c, 474f, 474g to naturally bias the first and second floating pistons 468a, 468b to a centered position where the second and third piston chambers 474b, 474c and the sixth and seventh piston chambers 474f, 474g have equal volumes.

The first manifold conduit 462a is arranged in fluid communication with the first manifold hydraulic line 438a, the second manifold conduit 462b is arranged in fluid communication with the second manifold hydraulic line 438b, the fifth manifold conduit 462e is arranged in fluid communication with the fourth manifold hydraulic line 438d, and the sixth manifold conduit 462f is arranged in fluid communication with the third manifold hydraulic line 438c. The third manifold conduit 462c is arranged in fluid communication with the second and sixth piston chambers 474b, 474f while the fourth manifold conduit 462d is arranged in fluid communication with the third and seventh piston chambers 474c, 474g. As a result, fluid pressure in the fourth piston chamber 474d and thus the fifth manifold conduit 462e can be increased independently of the first manifold conduit 462a by closing the first manifold comfort valve 460a and opening the fourth manifold valve 422d when the bi-directional pump 410 is running in the first direction, which increases pressure in the third piston chamber 474c and urges the first floating piston 468a to the right in FIG. 5, decreasing the volume of the fourth piston chamber 474d and increasing the pressure in the fourth piston chamber 474d. Similarly, fluid pressure in the eighth piston chamber 474h and thus the sixth manifold conduit 462f can be increased independently of the second manifold conduit 462b by closing the second manifold comfort valve 460b and opening the fourth manifold valve 422d when the bi-directional pump 410 is running in the first direction, which increases pressure in the seventh piston chamber 474g and urges the second floating piston 468b to the right in FIG. 5, decreasing the volume of the eighth piston chamber 474h and increasing the pressure in the eighth piston chamber 474h.

Fluid pressure in the first piston chamber 474a and thus the first manifold conduit 462a can also be increased without opening the first manifold valve 422a by actuating the first floating piston 468a, where the first manifold comfort valve 460a is closed and the third manifold valve 422c is open when the bi-directional pump 410 is running in the first direction, which increases pressure in the second piston chamber 474b and urges the first floating piston 468a to the left in FIG. 5, decreasing the volume of the first piston chamber 474a and increasing the pressure in the first piston chamber 474a. Similarly, fluid pressure in the fifth piston chamber 474e and the second manifold conduit 462b can also be increased without opening the second manifold valve 422b by actuating the second floating piston 468b, where the second manifold comfort valve 460b is closed and the third manifold valve 422c is open when the bi-directional pump 410 is running in the first direction, which increases pressure in the sixth piston chamber 474f and urges the second floating piston 468b to the left in FIG. 5, decreasing the volume of the fifth piston chamber 474e and increasing the pressure in the second piston chamber 474e.

The manifold assembly 404 may further include a first manifold accumulator 476a that is arranged in fluid communication with the third manifold conduit 462c between the third manifold valve 422c and the second and sixth piston chambers 474b, 474f and a second manifold accumulator 476b that is arranged in fluid communication with the fourth manifold conduit 462d between the third and seventh piston chambers 474c, 474g. The first and second manifold accumulators 476a, 476b may be constructed in a number of different ways. For example and without limitation, the first and second manifold accumulators 476a, 476b may have accumulation chambers and pressurized gas chambers that are separated by floating pistons or flexible membranes. Under braking, fluid flow within the four hydraulic circuits generates a pressure difference between the first and second manifold accumulators 476a, 476b, which in turn causes an increase in pressure in the front left and front right accumulators 442a, 442b and provides a pitch stiffness that resists the compression of the front dampers 402a, 402b and rebound/extension of the back dampers 402c, 402d. Under acceleration, fluid flow within the four hydraulic circuits generates an opposite pressure difference between the first and second manifold accumulators 476a, 476b, which in turn causes an increase in pressure in the back left and back right accumulators 442c, 442d and provides a pitch stiffness that resists the rebound/extension of the front dampers 402a, 402b and compression of the back dampers 402c, 402d. Additional pitch resistance can be added before a braking or acceleration event by opening the third and fourth manifold valves 422c, 422d as the bi-directional pump 410 is running in the first direction. The bi-directional pump 410 draws in hydraulic fluid from the reservoir hydraulic line 418 and discharges hydraulic fluid into the pump hydraulic line 408 to produce a positive pressure in the pump hydraulic line 408, which increases fluid pressure in the first and second manifold accumulators 476a, 476b. In a similar way, the pitch stiffness of the system can be reduced before a braking or acceleration event by running the bi-directional pump 410 in the second direction while opening the third and fourth manifold valves 422c, 422d.

The manifold assembly 404 may also include six pressure sensors 424a, 424b, 424c, 424d, 424e, 424f: a first pressure sensor 424a arranged to monitor fluid pressure in the first manifold conduit 462a, a second pressure sensor 424b arranged to monitor fluid pressure in the second manifold conduit 462b, a third pressure sensor 424c arranged to monitor fluid pressure in the third manifold conduit 462c, a fourth pressure sensor 424d arranged to monitor fluid pressure in the fourth manifold conduit 462d, a fifth pressure sensor 424e arranged to monitor fluid pressure in the fifth manifold conduit 462e, and a sixth pressure sensor 424f arranged to monitor fluid pressure in the sixth manifold conduit 462f. While not shown in FIG. 5, the pressure sensors 424a, 424b, 424c, 424d, 424e, 424f are all electrically connected to the controller.

Figure 6:
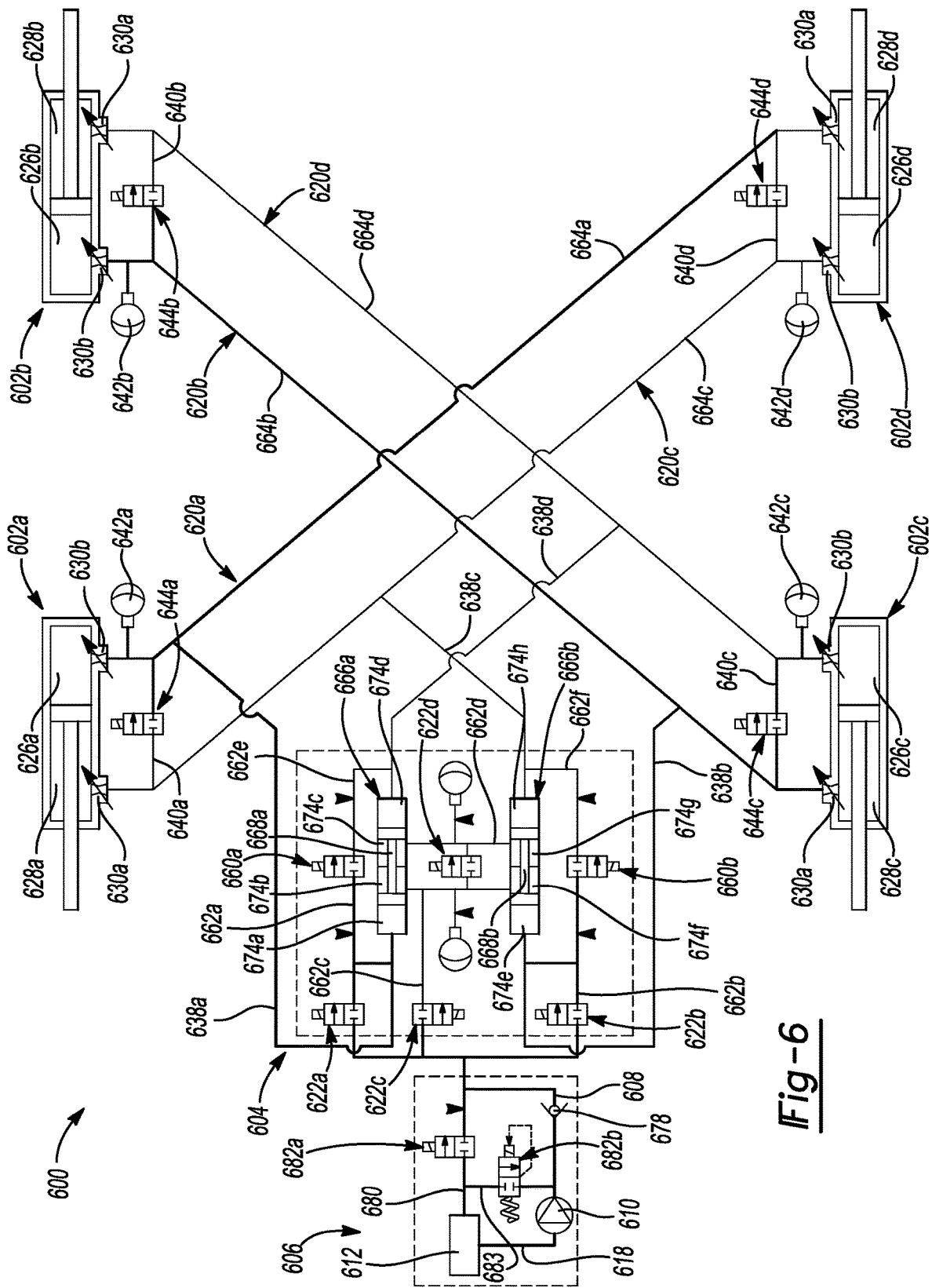
FIG. 6 is a schematic diagram illustrating another exemplary suspension system of the present disclosure that includes four hydraulic circuits connecting the front and rear dampers and another exemplary comfort valve equipped manifold assembly.

FIG. 6 illustrates another suspension system 600 that shares many of the same components as the suspension system 400 illustrated in FIGS. 4 and 5, but in FIG. 6 different pump 610 and manifold assemblies 604 have been utilized. Rather than repeat the description set forth above, the following paragraphs describe the structure and function of the components in FIG. 6 that are new and/or different from those shown and described in connection with FIGS. 4 and 5. It should be appreciated that the reference numbers in FIGS. 4 and 5 are "400" series numbers (e.g., 400, 402, 404, etc.) whereas the components in FIG. 6 that are the same or similar to the components of the suspension system 400 shown in FIGS. 4 and 5 share the same base reference numbers, but are listed as "600" series numbers (e.g., 600, 602, 604, etc.). Thus, the same description for element 400 above applies to element 600 in FIG. 6 and so on and so forth.

The pump assembly 606 illustrated in FIG. 6 includes a single direction pump 610 with an inlet port that is connected in fluid communication with the hydraulic reservoir 612 by a reservoir hydraulic line 618 and an outlet port that is connected to the pump hydraulic line 608. In operation, the single direction pump 610 draws in hydraulic fluid from the reservoir hydraulic line 618 via the inlet port and discharges hydraulic fluid into the pump hydraulic line 608 via the outlet port. As such, the single direction pump 610 produces a positive pressure in the pump hydraulic line 608 that can be used by manifold assembly 604 to increase fluid pressure in the suspension system 600. A check valve 678 is positioned in the pump hydraulic line 608 to prevent back feed when the single direction pump 610 is turned off. The pump assembly 606 also includes a return hydraulic line 680 that extends from the pump hydraulic line 108 to the hydraulic reservoir 612. A first pump valve 682a is positioned in-line with the return hydraulic line 680. The pump assembly 606 also includes a pump bridge hydraulic line 683 that includes a second pump valve 682b mounted in-line with the pump bridge hydraulic line 683. The pump bridge hydraulic line 683 connects to the pump hydraulic line 608 at a location between the single direct pump 610 and the check valve 678 and connects to the return hydraulic line 680 at a location between the first pump valve 682a and the hydraulic reservoir 612. In accordance with this arrangement, fluid pressure in the pump hydraulic line 608 can be increased by turning on the pump 610 and closing the second pump valve 682b and fluid pressure in the pump hydraulic line 608 can be decreased by turning the pump 610 off and opening the first pump valve 682a.

In the example illustrated in FIG. 6, only three manifold valves 622a, 622b, 622c (i.e., the first manifold valve 622a, the second manifold valve 622b, and the third manifold valve 622c) are connected in parallel with the pump hydraulic line 608. The fourth manifold valve 622d is positioned between the first and second piston bores 666a, 666b and is arranged in fluid communication with the third manifold conduit 662c on one side and the fourth manifold conduit 662d on the other side. Thus, to increase fluid pressure in the fifth and/or sixth manifold conduits 662e, 662f independently of the first and second manifold conduits 662a, 662b, the third and fourth manifold valves 622c, 622d must be open while the pump 610 is running and the first and second manifold comfort valves 660a, 660b are closed to increase fluid pressure in the third and seventh piston chambers 674c, 674g, which urges the first and second floating pistons 668a, 668b to the right in FIG. 6 decreasing the volume of the fourth and eighth piston chambers 674d, 674h and increasing the pressure in the fourth and eighth piston chambers 674d, 674h.

Figure 7:
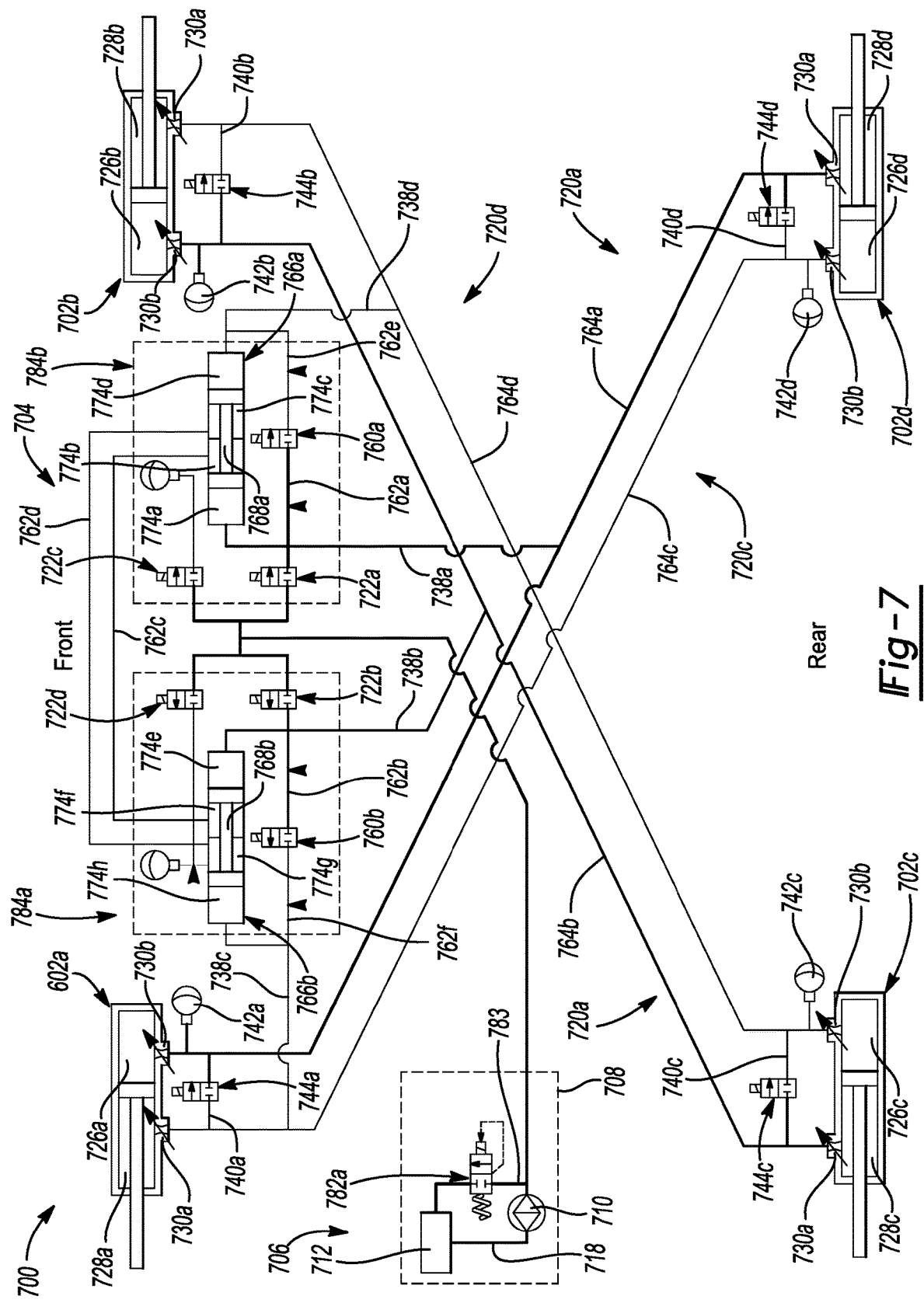
FIG. 7 is a schematic diagram illustrating another exemplary suspension system of the present disclosure that includes four hydraulic circuits connecting the front and rear dampers and another exemplary comfort valve equipped manifold assembly.

FIG. 7 illustrates another suspension system 700 that shares many of the same components as the suspension system 400 illustrated in FIGS. 4 and 5, but in FIG. 7 a different manifold assembly 704 has been utilized. Rather than repeat the description set forth above, the following paragraphs describe the structure and function of the components in FIG. 7 that are new and/or different from those shown and described in connection with FIGS. 4 and 5. It should be appreciated that the reference numbers in FIGS. 4 and 5 are "400" series numbers (e.g., 400, 402, 404, etc.) whereas the components in FIG. 7 that are the same or similar to the components of the suspension system 400 shown in FIGS. 4 and 5 share the same base reference numbers, but are listed as "700" series numbers (e.g., 700, 702, 704, etc.). Thus, the same description for element 400 above applies to element 700 in FIG. 7 and so on and so forth.

The manifold assembly 704 illustrated in FIG. 7 has the same components and hydraulic arrangement as the manifold assembly 404 illustrated in FIGS. 4 and 5, but in FIG. 7 the placement of the various components of the manifold assembly 704 is different to allow the manifold assembly 704 to be packaged in the front of the vehicle between the front dampers 702a, 702b. The manifold assembly 704 illustrated in FIG. 7 includes a front left sub-assembly 784a and a front right sub-assembly 784b. The front right sub-assembly 784b includes the first piston bore 766a, the first floating piston 768a, the first manifold valve 722a, the third manifold valve 722c, the first manifold conduit 762a, and the fifth manifold conduit 762e. The front left sub-assembly 784a includes the second piston bore 466b, the second floating piston 768b, the second manifold valve 722b, the fourth manifold valve 722d, the second manifold conduit 762b, and the sixth manifold conduit 762f. The pump hydraulic line 708 extends between the front left and front right sub-assemblies 784a, 784b and splits to connect to the manifold valves 722a, 722b, 722c, 722d on either side. The third and fourth manifold conduits 762c, 762d extend laterally between the front left and front right sub-assemblies 784a, 784b to connect the second and sixth piston chambers 774b, 774f and the third and seventh piston chambers 774c, 774g, respectively. It should be appreciated that the order and arrangement of the piston chambers 774e, 774f, 774g, 774h in the second piston bore 766b shown in FIG. 7 is opposite from that shown in FIGS. 4 and 5. In other words, in accordance with the arrangement shown in FIG. 7, the first piston chamber 774a (which is connected in fluid communication with the first manifold conduit 762a) faces the fifth piston chamber 774e (which is connection in fluid communication with the second manifold conduit 762b). In other words, in FIG. 7 the fifth piston chamber 774e (which is connection in fluid communication with the second manifold conduit 762b) is to the right of the eighth piston chamber 774h (which is connected in fluid communication with the sixth manifold conduit 762f), whereas in FIGS. 4 and 5 the fifth piston chamber 474e (which is connected in fluid communication with the second manifold conduit 462b) is to the left of the eighth piston chamber 474h (which is connected in fluid communication with the sixth manifold conduit 462f). This reversal of the arrangement of the piston chambers 774e, 774f, 774g, 774h in the second piston bore 766b simplifies and shortens the runs required for the manifold hydraulic lines 738a, 738b, 738c, 738d and is therefore advantageous.

Figure 8:
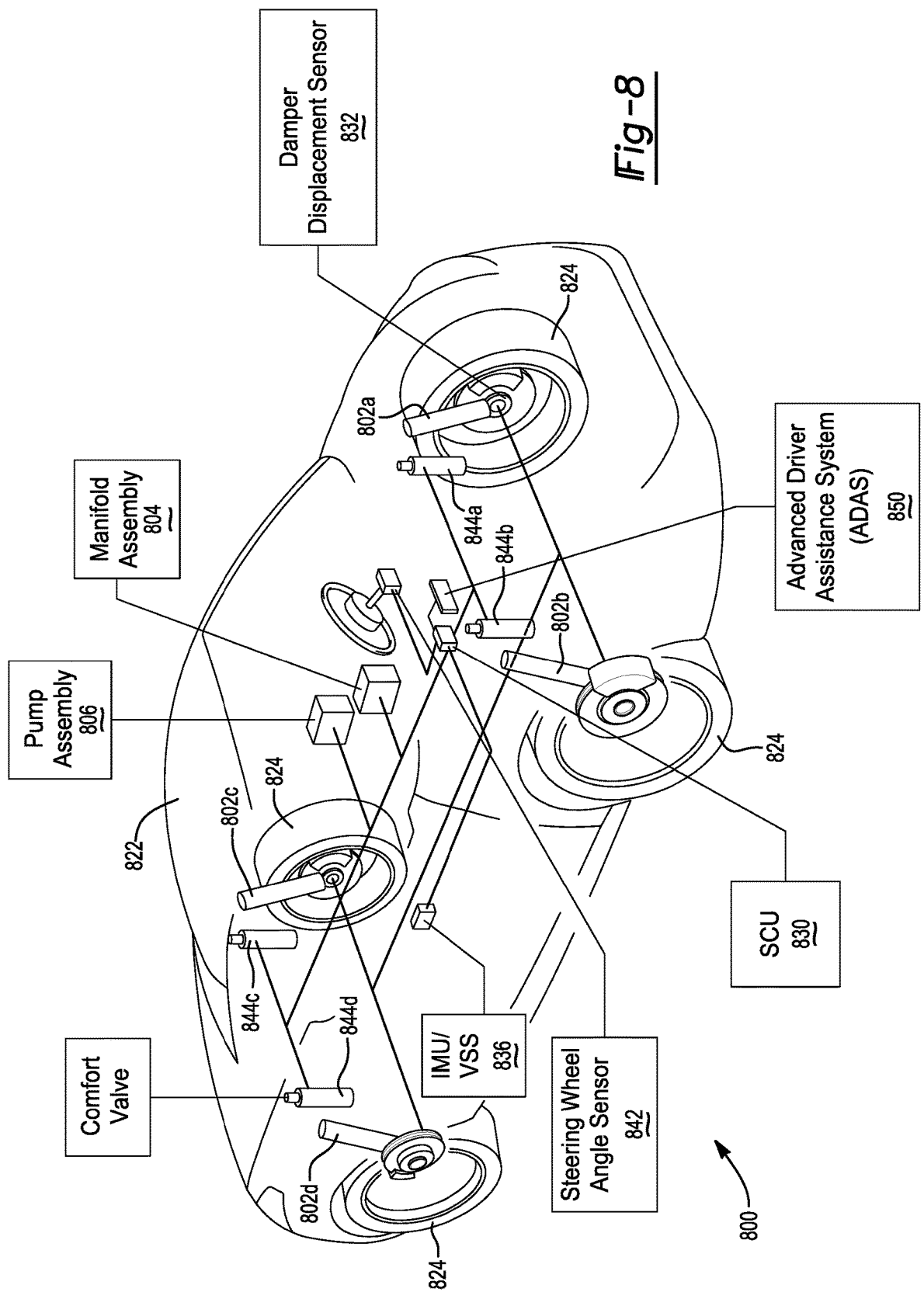
FIG. 8 is a schematic diagram illustrating a vehicle equipped with an exemplary suspension control system in accordance with the present disclosure.

With reference to FIG. 8, an exemplary vehicle 822 is illustrated that has been equipped with a suspension system 800 of the present disclosure. The vehicle 822 in FIG. 8 has been illustrated as an automobile; however, it should be appreciated that the suspension system 800 described herein is not limited to automobiles and may be used in other types of vehicles. In the illustrated example, the vehicle 822 has four wheels 824. Similarly, the suspension system 800 of the vehicle 822 includes a plurality of dampers 802a-802d, with one damper 802a-802d per wheel 824, including a front left damper 802a, a front right damper 802b, a back left damper 802c, and a back right damper 802d. The suspension system 800 of the vehicle 822 also includes a plurality of comfort valves 844a-844d, with one comfort valve 844a-844d per wheel 824. The plurality of dampers 802a-802d and the plurality of comfort valves 844a-844d are hydraulically connected to a manifold assembly 804 via a plurality of hydraulic circuits 420a-420d, which are shown in FIG. 4 rather than in FIG. 8. This is because the lines in FIG. 8 illustrate electrical connections (e.g., electric wiring), which is different from the lines in FIGS. 1-7, which illustrate hydraulic connections (e.g., hydraulic lines and conduits). However, it should be appreciated that the electronic/electrical connections described herein are not necessarily limited to wired connections, as wireless connections between various components can also be used. It should also be appreciated that any of the hydraulic arrangements shown in FIGS. 1-7 may be implemented in combination with the electrical arrangement shown in FIG. 8.

The manifold assembly 804 is hydraulically connected to a pump assembly 806 and may include a first manifold comfort valve 460a (shown in FIGS. 4 and 5) that is configured to open and close to control fluid flow between the front left damper 802a and the back left damper 802c and a second manifold comfort valve 460b (shown in FIGS. 4 and 5) that is configured to open and close to control fluid flow between the front right damper 802b and the back right damper 802d. More specifically and with reference to FIG. 4, the plurality of hydraulic circuits 420a-420d include a first hydraulic circuit 420a that extends between and fluidly connects a first compression chamber 426a of the front left damper 802a and a fourth rebound chamber 428d of the back right damper 802d, a second hydraulic circuit 420b that extends between and fluidly connects the second compression chamber 426b of the front right damper 402b and the third rebound chamber 428c of the back left damper 402c, a third hydraulic circuit 420c that extends between and fluidly connects a first rebound chamber 428a of the front left damper 402a and a fourth compression chamber 426d of the back right damper 402d, and a fourth hydraulic circuit 420d that extends between and fluidly connects a second rebound chamber 428b of the front right damper 402b and a third compression chamber 426c of the back left damper 402c. The first manifold comfort valve 460a is an electromechanical valve configured to open and close a first fluid flow path (formed by the first and fifth manifold conduits 462a and 462e) through the manifold assembly 804 that extends between and is arranged in fluid communication with the first and fourth hydraulic circuits 420a, 420d (via the first and fourth manifold hydraulic lines 438a and 438d). Similarly, the second manifold comfort valve 460b is an electromechanical valve configured to open and close a second fluid flow path (formed by the second and sixth manifold conduits 462b and 462f) through the manifold assembly 804 that extends between and is arranged in fluid communication with the second and third hydraulic circuits 420b, 420c (via the second and third manifold hydraulic lines 438b and 438c).

The plurality of comfort valves 844a-844d includes a front left comfort valve 844a, a front right comfort valve 844b, a back left comfort valve 844c, and a back right comfort valve 844d. The front left comfort valve 844a and a back right comfort valve 844d are configured to open and close to control fluid flow between the first and third hydraulic circuits 420*a*, 420*c*. The front right comfort valve 844*b* and a back left comfort valve 844*c* are configured to open and close to control fluid flow between the second and fourth hydraulic circuits 420*b*, 420*d*.

The suspension system 800 includes one or more onboard sensors that are configured to generate real-time vehicle data. For example, the onboard sensor(s) of the suspension system 800 may include one or more pressure sensors 424*a*-424*f* (as shown in FIG. 5) for measuring fluid pressure within the hydraulic circuits 420*a*-420*d*, one or more damper displacement sensors 832 positioned at each wheel 824 of the vehicle 822 for measuring the displacement (i.e., travel) of the dampers 802*a*-802*d*, an inertial measurement unit (IMU)/vehicle speed sensor (VSS) 836 for measuring vehicle speed and the lateral and longitudinal acceleration of the vehicle 822, and a steering wheel angle sensor 842 for measuring the steering angle of initiated steering inputs made by the driver of the vehicle 822.

The suspension system 800 also includes a suspension control unit (SCU) 830 and an advanced driver assistance system (ADAS) 850 that include one or more processors or controllers configured to execute computer programs to control the suspension system by implementing the control methods described below and memory that is programmed with the aforementioned computer programs and control methods.

The pressure sensors 424*a*-424*f* (as shown in FIG. 5) measure fluid pressure within the hydraulic circuits 420*a*-420*d* and generate pressure sensor signals that are indicative of the fluid pressure within each of the hydraulic circuits 420*a*-420*d*. The pressure sensors 424*a*-424*f* are arranged in electronic communication with the suspension control unit (SCU) 830 such that the suspension control unit (SCU) 830 can derive and monitor the fluid pressures within the hydraulic circuits 420*a*-420*d* from pressure sensor signals it receives from the pressure sensors 424*a*-424*f*.

The suspension displacement sensors 832 may be mounted to the wheel knuckle, axle, control arm, swing arm, damper, or other components that support and move up and down with the wheel 824 as the wheel 824 travels over road irregularities, such as bumps and pot-holes. Alternatively, the suspension displacement sensors 832 may be mounted to the wheels 824 themselves. The suspension displacement sensors 832 are arranged in electronic communication with the suspension control unit (SCU) 830 and are configured to provide suspension displacement (i.e., wheel travel) data to the suspension control unit (SCU) 830. The suspension displacement sensors 832 generate damper displacement signals indicative of damper displacement for each of the dampers 802*a*-802*d* and the damper displacement signals are sent or relayed to the suspension control unit (SCU) 830 for processing in accordance with the control methods described below.

The inertial measurement unit (IMU)/vehicle speed sensor (VSS) 836 is arranged in electronic communication with the suspension control unit (SCU) 830 and is configured to provide sprung mass acceleration data and vehicle speed data to the suspension control unit (SCU) 830. As such, the inertial measurement unit (IMU)/vehicle speed sensor (VSS) 836 may include one or more accelerometers that are mounted to the vehicle body for measuring linear and/or longitudinal accelerations of the sprung mass of the vehicle 822 and one or more gyroscopes or magnetometers for providing tilt (i.e., pitch and roll angle) measurements and heading references. Although other forms of sensors may be used, the vehicle speed sensor (VSS) may be a wheel speed sensor, for example. In an alternative embodiment, the inertial measurement unit (IMU)/vehicle speed sensor (VSS) 836 may be provided as separate, stand-alone components and the inertial measurement unit (IMU) could be replaced by accelerometers, if desired. The inertial measurement unit (IMU)/vehicle speed sensor (VSS) 836 generates a vehicle speed signal, a lateral acceleration signal, and a longitudinal acceleration signal that are indicative of the vehicle speed and the lateral and longitudinal accelerations of the vehicle. The vehicle speed signal, a lateral acceleration signal, and a longitudinal acceleration signal are sent or relayed to the suspension control unit (SCU) 830 for processing in accordance with the control methods described below.

The steering wheel angle sensor 842 is arranged in electronic communication with the suspension control unit (SCU) 830 and is configured to measure the steering angle of initiated steering inputs made by the driver of the vehicle 822. The steering wheel angle sensor 842 generates a steering wheel angle signal, which is indicative of the steering wheel angle of initiated steering inputs, and sends or relays the steering wheel angle signal to the suspension control unit (SCU) 830 for processing in accordance with the control methods described below.

The suspension control unit (SCU) 830 is arranged in electronic communication with the first and second manifold comfort valves 460*a*, 460*b* of the manifold assembly 804 (as shown in FIG. 5), the pump assembly 806, the comfort valves 844*a*-844*d* positioned at each corner of the vehicle 822 adjacent to the dampers 802*a*-802*d*, the advanced driver assistance system (ADAS) 850, the pressure sensors 424*a*-424*f* (as shown in FIG. 5), the damper displacement sensors 832 positioned at each wheel 824 of the vehicle 822, the inertial measurement unit (IMU)/vehicle speed sensor (VSS) 836, and the steering wheel angle sensor 842. The memory of the suspension control unit (SCU) 830 is programmed to: monitor the real-time data generated by the onboard sensor(s) 424*a*-424*f*, 832, 836, 842, retrieve a target roll stiffness, a target pitch stiffness, and/or a target pressure from its memory, and calculate an effective roll stiffness and/or an effective pitch stiffness of the suspension system 800 based on the real-time data.

As will also be explained in connection with the control methods described below, the suspension control unit (SCU) 830 can be programmed to calculate the effective roll stiffness and/or the effective pitch stiffness of the suspension system 800 in one of three ways.

In accordance with one arrangement, the suspension control unit (SCU) 830 can be programmed to calculate a roll moment and a pitch moment from the fluid pressure indicated by the pressure sensor signals the suspension control unit (SCU) 830 receives from the pressure sensors 424*a*-424*f* in the manifold assembly 804. The suspension control unit (SCU) 830 is also programmed to calculate a roll angle and a pitch angle from the damper displacement indicated by the damper displacement signals the suspension control unit (SCU) 830 receives from the damper displacement sensors 832. Alternatively, the suspension control unit (SCU) 830 may receive signals indicative of the roll and/or pitch angles from the inertial measurement unit (IMU)/vehicle speed sensor (VSS) 836. The suspension control unit (SCU) 830 is further programmed to calculate the effective roll stiffness of the suspension system 800 by dividing the roll moment by the roll angle and/or calculate the effective pitch stiffness of the suspension system 800 by dividing the pitch moment by the pitch angle.

In accordance with another arrangement, the suspension control unit (SCU) 830 can be programmed to calculate the effective roll stiffness based on the roll angle and the lateral acceleration indicated by the lateral acceleration signal the suspension control unit (SCU) 830 receives from the inertial measurement unit (IMU)/vehicle speed sensor (VSS) 836 and/or calculate the effective pitch stiffness based on the pitch angle and the longitudinal acceleration indicated by the longitudinal acceleration signal the suspension control unit (SCU) 830 receives from the inertial measurement unit (IMU)/vehicle speed sensor (VSS) 836.

In accordance with another arrangement, the suspension control unit (SCU) 830 can be programmed to calculate the effective roll stiffness based on the roll moment and the lateral acceleration indicated by the lateral acceleration signal the suspension control unit (SCU) 830 receives from the inertial measurement unit (IMU)/vehicle speed sensor (VSS) 836 and/or calculate the effective pitch stiffness based on the pitch moment and the longitudinal acceleration indicated by the longitudinal acceleration signal the suspension control unit (SCU) 830 receives from the inertial measurement unit (IMU)/vehicle speed sensor (VSS) 836.

The advanced driver assistance systems (ADAS) 850 is arranged in electronic communication with the suspension control unit (SCU) 830 and is programmed to electronically communicate a driver assistance system active intervention status to the suspension control unit (SCU) 830 as part of a two-way communication protocol the advanced driver assistance systems (ADAS) 850 performs with the suspension control unit (SCU) 830 Like the suspension control unit (SCU) 830, the advanced driver assistance systems (ADAS) 850 has a processor and memory, which may or may not be shared with other components, such as the suspension control unit (SCU) 830. Thus, the calculation of the effective roll stiffness and effective pitch stiffness, as described above, can alternatively be offloaded and processed by the advanced driver assistance systems (ADAS) 850 instead of the suspension control unit (SCU) 830. It should also be appreciated that the advanced driver assistance systems (ADAS) 850 may be a single driver assistance system with one or more modules or components or alternatively may be a number of different driver assistance systems arranged in an on-board vehicle network. For example and without limitation, the advanced driver assistance system (ADAS) 850 may include a stability control system, anti-lock braking system, anti-rollover system, anti-lane departure system, and/or collision avoidance system.

The memory of the advanced driver assistance system (ADAS) 850 is programmed to generate and/or update a vehicle stability model based on a combination of the real-time data and one or more of the target roll stiffness, the target pitch stiffness, the effective roll stiffness, and the effective pitch stiffness. The advanced driver assistance system (ADAS) 850 is programmed to determine if the vehicle 822 can complete an initiated turn without oversteer or understeer based on a combination of the vehicle speed indicated by the vehicle speed signal and/or the lateral acceleration indicated by the lateral acceleration signal from the inertial measurement unit (IMU)/vehicle speed sensor (VSS) 836, the steering wheel angle indicated by the steering wheel angle signal from the steering wheel angle sensor 842, and one or more of the target roll stiffness, the target pitch stiffness, the effective roll stiffness, and the effective pitch stiffness. If the advanced driver assistance system (ADAS) 850 determines that the vehicle 822 cannot complete the initiated turn without oversteer or understeer under current conditions, the advanced driver assistance system (ADAS) 850 is programmed to utilize the vehicle stability model to determine if the vehicle 822 can complete the initiated turn at a different target stiffness without oversteer or understeer. The advanced driver assistance system (ADAS) 850 is further programmed to send a request to the suspension control unit (SCU) 830 for a new comfort valve setting corresponding to the different target stiffness in response to determining that the vehicle 822 can complete the initiated turn at the different target stiffness without oversteer or understeer. On the other hand, if the advanced driver assistance system (ADAS) 850 determines that the vehicle 822 cannot complete the initiated turn without oversteer or understeer at any target stiffness, then the advanced driver assistance system (ADAS) 850 initiates a corrective action in the form of an interventional throttle input, an interventional brake input, and/or an interventional steering input.

The memory of the suspension control unit (SCU) 830 is further programmed to initiate the new comfort valve setting corresponding to the different target stiffness when the suspension control unit (SCU) 830 receives a request for a different target stiffness/new comfort valve setting from the advanced driver assistance system (ADAS) 850. Thus, it should be appreciated that once the advanced driver assistance system (ADAS) 850 determines that a different target stiffness is desirable, the step of determining a new comfort valve setting that will achieve that different target stiffness may be performed by either the suspension control unit (SCU) 830, the advanced driver assistance system (ADAS) 850, or some combination thereof. Regardless, the suspension control unit (SCU) 830 initiates the new comfort valve setting by generating and sending one or more control signals to the comfort valves 844a-844d, 460a, 460b that actuate (e.g., open or close) the comfort valves 844a-844d, 460a, 460b based on the new comfort valve setting to increase or decrease the roll stiffness and/or pitch stiffness of the suspension system 800. For example, it should be appreciated that, generally speaking, opening the comfort valves 844a-844d, 460a, 460b decreases the roll stiffness and/or pitch stiffness of the suspension system 800, while closing the comfort valves 844a-844d, 460a, 460b increases the roll stiffness and/or pitch stiffness of the suspension system 800.

Figure 9:
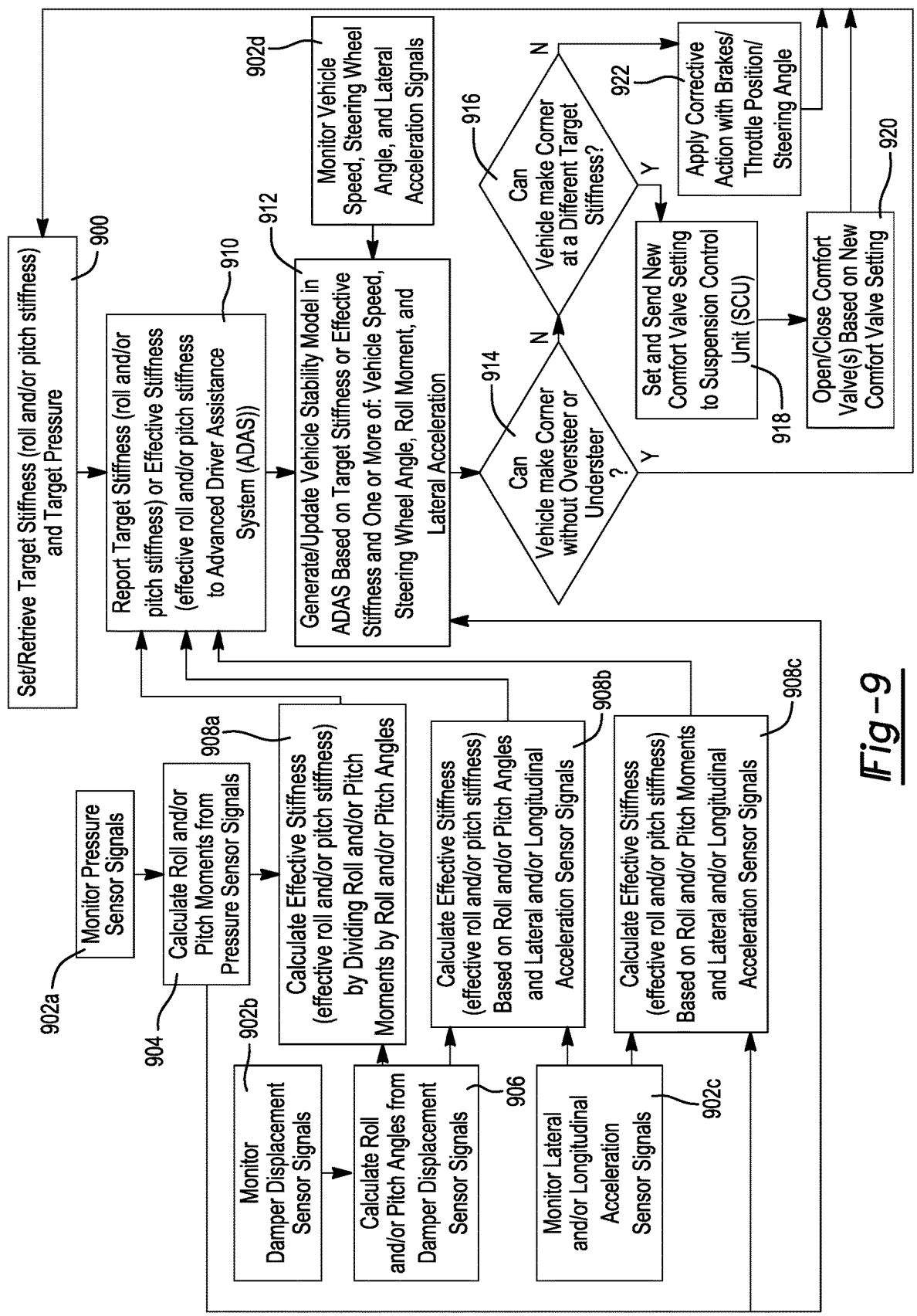
FIG. 9 is a flow diagram illustrating an exemplary method of controlling the roll stiffness of the exemplary suspension systems described in the present disclosure.
Figure 10:
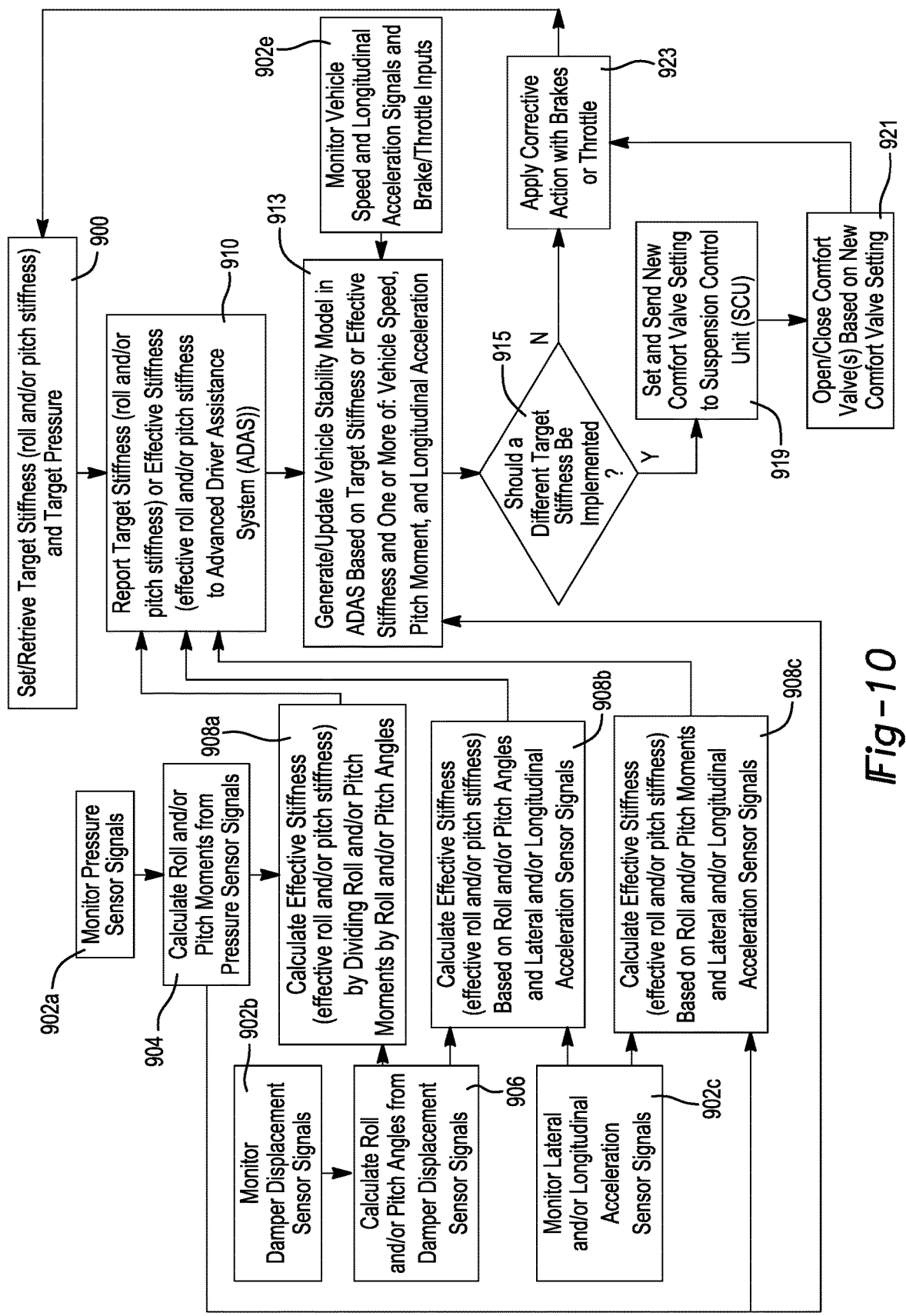
FIG. 10 is another flow diagram illustrating an exemplary method of controlling the pitch stiffness of the exemplary suspension systems described in the present disclosure.

FIGS. 9 and 10 illustrate two related methods of controlling the suspension system 800 described above. The method illustrated in FIG. 9 depicts a control scheme/regime where a turn has been initiated by the driver of the vehicle 822 and the advanced driver assistance system (ADAS) 850 makes a request to the suspension control unit (SCU) 830 for a new comfort valve setting that will change/alter (e.g., increase) the roll stiffness of the suspension system 800 in order to reduce or eliminate oversteer or understeer during the turn. The method illustrated in FIG. 10 depicts a control scheme/regime where a throttle input or brake input has been initiated by the driver of the vehicle 822 and the advanced driver assistance system (ADAS) 850 makes a request to the suspension control unit (SCU) 830 for a new comfort valve setting that will change/alter (e.g., increase) the pitch stiffness of the suspension system 800 in order to reduce or eliminate fore and aft pitching during a braking or acceleration maneuver/event. Both methods begin the same way and therefore will be discussed together.

As described above, the plurality of dampers 802a-802d are connected to each other and a plurality of comfort valves 460a, 460b, 844a-844d, via a plurality of hydraulic circuits 420a-420d. The methods illustrated in FIGS. 9 and 10 begin with step 900 of setting a target roll stiffness, a target pitch stiffness, and/or a target pressure for the suspension system 800 in the memory of the suspension control unit (SCU)

830. The method proceeds with retrieving the target roll stiffness, the target pitch stiffness, and/or the target pressure from the memory to make these values available to the processor of the suspension control unit (SCU) 830. Steps 902a-d illustrate various monitoring steps where the suspension control unit (SCU) 830 monitors the real-time data the suspension control unit (SCU) 830 receives from onboard sensors or systems 424a-424f, 832, 836, 842. For example, the suspension control unit (SCU) 830 performs step 902a of monitoring the pressure sensor signals generated by the pressure sensors 424a-424f in the manifold assembly 804 and derives the fluid pressures within the hydraulic circuits 420a-420d from the pressure sensor signals. The suspension control unit (SCU) 830 performs step 902b of monitoring the damper displacement signals generated by the damper displacement sensors 832 and derives the damper displacement for each of the dampers 802a-802d from the damper displacement signals. The suspension control unit (SCU) 830 also performs step 902c of monitoring the lateral and longitudinal acceleration signals generated by the inertial measurement unit (IMU)/vehicle speed sensor (VSS) 836 and derives the lateral and longitudinal accelerations of the vehicle 822 from the lateral and longitudinal acceleration signals. The suspension control unit (SCU) 830 further performs step 904 of calculating a roll moment and a pitch moment from the fluid pressure of each of the hydraulic circuits 420a-420d, as indicated by the pressure sensor signal, and step 906 of calculating a roll angle and a pitch angle from the damper displacement of each damper 802a-802d, as indicated by the damper displacement signals.

As described above, the suspension control unit (SCU) 830 may calculate an effective roll stiffness and an effective pitch stiffness of the suspension system 800 in a number of different ways. Three different iterations are provided in FIGS. 9 and 10 as non-limiting examples. As such, it should be appreciated that there may be additional ways of calculating the effective roll stiffness and effective pitch stiffness of the suspension system 800 other than those expressly described herein that may still fall within the scope of the appended claims. In one example, the method includes step 908a of calculating the effective roll stiffness by dividing the roll moment by the roll angle and calculating the effective pitch stiffness by dividing the pitch moment by the pitch angle. In another example, the method includes step 908b of calculating the effective roll stiffness based on the roll angle and the lateral acceleration indicated by the lateral acceleration signal and calculating the effective pitch stiffness based on the pitch angle and the longitudinal acceleration indicated by the longitudinal acceleration signal. In yet another example, the method includes step 908c of calculating the effective roll stiffness based on the roll moment and the lateral acceleration indicated by the lateral acceleration signal and calculating the effective pitch stiffness based on the pitch moment and the longitudinal acceleration indicated by the longitudinal acceleration signal. Thus, various combinations of steps 908a-808c are also possible and are within the scope of the present disclosure.

The method also includes step 910 of reporting at least one of: the target roll stiffness, the target pitch stiffness, the effective roll stiffness, and the effective pitch stiffness from the suspension control unit (SCU) 830 to the advanced driver assistance system (ADAS) 850. However, as noted above, in an alternative implementation where the advanced driver assistance system (ADAS) 850 performs steps 904, 906, and/or 908a-808c, step 910 may only include having the suspension control unit (SCU) 830 report the target pitch and roll stiffnesses to the advanced driver assistance system (ADAS) 850. Similarly, in alternative configurations where the suspension control unit (SCU) 830 only reports the target pitch and roll stiffnesses to the advanced driver assistance system (ADAS) 850, steps 902a-902c, 904, 906, and/or 908a-808c may be eliminated.

With reference now to the method illustrated in FIG. 9, specifically, the suspension control unit (SCU) 830 further performs step 902d of monitoring the vehicle speed signal and the lateral acceleration signal generated by the inertial measurement unit (IMU)/vehicle speed sensor (VSS) 836, monitoring the steering wheel angle signal generated by the steering wheel angle sensor 842, deriving the vehicle speed from the vehicle speed signal, deriving the lateral acceleration of the vehicle 822 from the lateral acceleration signal, and deriving the steering wheel angle from the steering wheel angle signal. The advanced driver assistance system (ADAS) 850 performs step 912 of generating and updating the vehicle stability model in the advanced driver assistance system (ADAS) 850 based on the target roll stiffness and/or the effective roll stiffness in combination with at least one of the vehicle speed, steering wheel angle, lateral acceleration, and roll moment. The advanced driver assistance system (ADAS) 850 also performs step 914 of utilizing the vehicle stability model to determine if the vehicle 822 can complete an initiated turn without oversteer or understeer at the current stiffness of the suspension system 800.

If the advanced driver assistance system (ADAS) 850 determines that the vehicle 822 can complete the initiated turn without oversteer or understeer at step 914, then the control regime proceeds by reiterating the method and returns to step 900 of retrieving the target roll stiffness, target pitch stiffness, and/or target pressure from the memory of the suspension control unit (SCU) 830. On the other hand, if the advanced driver assistance system (ADAS) 850 determines that the vehicle 822 cannot complete the initiated turn without oversteer or understeer at step 914, then the method proceeds with step 916 of utilizing the vehicle stability model to determine if the vehicle 822 can complete the initiated turn at a different target stiffness without oversteer or understeer. If the advanced driver assistance system (ADAS) 850 determines that the vehicle 822 can complete the initiated turn at a different target stiffness without oversteer or understeer, then the method proceeds with step 918 of sending a request from the advanced driver assistance system (ADAS) 850 to the suspension control unit (SCU) 930 for a new comfort valve setting corresponding to the different target stiffness. As noted above, either the suspension control unit (SCU) 930, the advanced driver assistance system (ADAS) 850, or some combination thereof, may perform the step of determining, correlating, and/or selecting a new comfort valve setting that will result in adjusting the suspension system 800 so that it reaches the different target stiffness identified/requested by the advanced driver assistance system (ADAS) 850. Regardless of which component performs this processing task, the suspension control unit (SCU) 930 proceeds with the step 920 of initiating the new comfort valve setting corresponding to the different target stiffness by actuating (i.e., opening and closing) one or more comfort valves 460a, 460b, 844a-844d based on the new comfort valve setting. However, if the advanced driver assistance system (ADAS) 850 determines that the vehicle 822 cannot complete the initiated turn at any target stiffness without oversteer or understeer, then the advanced driver assistance system (ADAS) 850 proceeds with the step 922 of initiating a corrective action in the form of initiating an interventional throttle input, an interventional brake input, and/or an interventional steering input. After step 920 or step 922, the control regime proceeds by reiterating the method and returns to step 900 of retrieving the target roll stiffness, target pitch stiffness, and/or target pressure from the memory of the suspension control unit (SCU) 830.

With reference to FIG. 10, steps 902a-902c, 904, 906, and/or 908a-808c are the same as those described above and therefore equally apply to this control method. However, the remaining steps of the method illustrated in FIG. 10 do differ from those described in connection with FIG. 9 and therefore will be described below.

With reference now to the method illustrated in FIG. 10, specifically, the suspension control unit (SCU) 830 further performs step 902e of monitoring vehicle speed signal and the longitudinal acceleration signal generated by the inertial measurement unit (IMU)/vehicle speed sensor (VSS) 836, monitoring the brake and throttle inputs made by the driver of the vehicle 822, deriving the vehicle speed from the vehicle speed signal, and deriving the longitudinal acceleration of the vehicle 822 from the longitudinal acceleration signal. The advanced driver assistance system (ADAS) 850 performs step 913 of generating and updating the vehicle stability model in the advanced driver assistance system (ADAS) 850 based on the target pitch stiffness and/or effective pitch stiffness in combination with at least one of the vehicle speed, longitudinal acceleration, and pitch moment. The advanced driver assistance system (ADAS) 850 also performs step 915 of utilizing the vehicle stability model to determine if a different target stiffness should be implemented in the suspension system 800 based at least in part on whether the advanced driver assistance system (ADAS) 850 has initiated a corrective action in the form of an interventional throttle input or an interventional brake input. For example, if the advanced driver assistance system (ADAS) 850 has initiated an interventional throttle input or an interventional brake input that may cause a pitch moment or pitch angle that is greater than a pre-defined pitch threshold or an acceptable pitch range, then the advanced driver assistance system (ADAS) 850 may determine that a different pitch stiffness should be implemented if the vehicle stability model shows that changing the target pitch stiffness of the suspension system 800 to the different pitch stiffness would result in a lower pitch moment or pitch angle that is below the pre-defined pitch threshold or within the acceptable pitch range for the vehicle 822.

If the advanced driver assistance system (ADAS) 850 determines that a different target stiffness should be implemented at step 915, then the method proceeds with step 919 of sending a request from the advanced driver assistance system (ADAS) 850 to the suspension control unit (SCU) 930 for a new comfort valve setting corresponding to the different target stiffness. As noted above, either the suspension control unit (SCU) 930, the advanced driver assistance system (ADAS) 850, or some combination thereof, may perform the step of determining, correlating, and/or selecting a new comfort valve setting that will result in adjusting the suspension system 800 so that it reaches the different target stiffness identified/requested by the advanced driver assistance system (ADAS) 850. Regardless of which component performs this processing task, the suspension control unit (SCU) 930 proceeds with the step 921 of initiating the new comfort valve setting corresponding to the different target stiffness by actuating (i.e., opening and closing) one or more comfort valves 460a, 460b, 844a-844d based on the new comfort valve setting. After step 921, the advanced driver assistance system (ADAS) 850 proceeds with step 923 of initiating a corrective action in the form of initiating an interventional throttle input or interventional brake input. Alternatively, if the advanced driver assistance system (ADAS) 850 determined that a different target stiffness should not be implemented, then the method proceeds immediately to step 923 of initiating the corrective action. After step 923, the control regime proceeds by reiterating the method and returns to step 900 of retrieving the target roll stiffness, target pitch stiffness, and/or target pressure from the memory of the suspension control unit (SCU) 830.

Many other modifications and variations of the present disclosure are possible in light of the above teachings and may be practiced otherwise than as specifically described while within the scope of the appended claims.

The foregoing description is merely illustrative in nature and is in no way intended to limit the disclosure, its application, or uses. The broad teachings of the disclosure can be implemented in a variety of forms. Therefore, while this disclosure includes particular examples, the true scope of the disclosure should not be so limited since other modifications will become apparent upon a study of the drawings, the specification, and the following claims. It should be understood that one or more steps within a method may be executed in different order (or concurrently) without altering the principles of the present disclosure. Further, although each of the embodiments is described above as having certain features, any one or more of those features described with respect to any embodiment of the disclosure can be implemented in and/or combined with features of any of the other embodiments, even if that combination is not explicitly described. In other words, the described embodiments are not mutually exclusive, and permutations of one or more embodiments with one another remain within the scope of this disclosure.

Spatial and functional relationships between elements (for example, between modules, circuit elements, semiconductor layers, etc.) are described using various terms, including "connected," "engaged," "coupled," "adjacent," "next to," "on top of," "above," "below," and "disposed." Unless explicitly described as being "direct," when a relationship between first and second elements is described in the above disclosure, that relationship can be a direct relationship where no other intervening elements are present between the first and second elements, but can also be an indirect relationship where one or more intervening elements are present (either spatially or functionally) between the first and second elements. As used herein, the phrase at least one of A, B, and C should be construed to mean a logical (A OR B OR C), using a non-exclusive logical OR, and should not be construed to mean "at least one of A, at least one of B, and at least one of C."

In the figures, the direction of an arrow, as indicated by the arrowhead, generally demonstrates the flow of information (such as data or instructions) that is of interest to the illustration. For example, when element A and element B exchange a variety of information but information transmitted from element A to element B is relevant to the illustration, the arrow may point from element A to element B. This unidirectional arrow does not imply that no other information is transmitted from element B to element A. Further, for information sent from element A to element B, element B may send requests for, or receipt acknowledgements of, the information to element A.

In the present disclosure, including in the definitions below, the term "module" or the "controller" may be replaced with the term "circuit." The term "module" may refer to, be part of, or include: an Application term Specific Integrated Circuit (ASIC); a digital, analog, or mixed analog/digital discrete circuit; a digital, analog, or mixed analog/digital integrated circuit; a combinational logic circuit; a field programmable gate array (FPGA); a processor circuit (shared, dedicated, or group) that executes code; a memory circuit (shared, dedicated, or group) that stores code executed by the processor circuit; other suitable hardware components that provide the described functionality; or a combination of some or all of the above, such as in a system-on-chip.

The module may include one or more interface circuits. In some examples, the interface circuits may include wired or wireless interfaces that are connected to a local area network (LAN), the Internet, a wide area network (WAN), or combinations thereof. The functionality of any given module of the present disclosure may be distributed among multiple modules that are connected via interface circuits. For example, multiple modules may allow load balancing. In a further example, a server (also known as remote, or cloud) module may accomplish some functionality on behalf of a client module.

The term code, as used above, may include software, firmware, and/or microcode, and may refer to programs, routines, functions, classes, data structures, and/or objects. The term shared processor circuit encompasses a single processor circuit that executes some or all code from multiple modules. The term group processor circuit encompasses a processor circuit that, in combination with additional processor circuits, executes some or all code from one or more modules. References to multiple processor circuits encompass multiple processor circuits on discrete dies, multiple processor circuits on a single die, multiple cores of a single processor circuit, multiple threads of a single processor circuit, or a combination of the above. The term shared memory circuit encompasses a single memory circuit that stores some or all code from multiple modules. The term group memory circuit encompasses a memory circuit that, in combination with additional memories, stores some or all code from one or more modules.

The term memory circuit is a subset of the term computer-readable medium. The term computer-readable medium, as used herein, does not encompass transitory electrical or electromagnetic signals propagating through a medium (such as on a carrier wave); the term computer-readable medium may therefore be considered tangible and non-transitory. Non-limiting examples of a non-transitory, tangible computer-readable medium are nonvolatile memory circuits (such as a flash memory circuit, an erasable programmable read-only memory circuit, or a mask read-only memory circuit), volatile memory circuits (such as a static random access memory circuit or a dynamic random access memory circuit), magnetic storage media (such as an analog or digital magnetic tape or a hard disk drive), and optical storage media (such as a CD, a DVD, or a Blu-ray Disc).

The apparatuses and methods described in this application may be partially or fully implemented by a special purpose computer created by configuring a general purpose computer to execute one or more particular functions embodied in computer programs. The functional blocks, flowchart components, and other elements described above serve as software specifications, which can be translated into the computer programs by the routine work of a skilled technician or programmer.

The computer programs include processor-executable instructions that are stored on at least one non-transitory, tangible computer-readable medium. The computer programs may also include or rely on stored data. The computer programs may encompass a basic input/output system (BIOS) that interacts with hardware of the special purpose computer, device drivers that interact with particular devices of the special purpose computer, one or more operating systems, user applications, background services, background applications, etc.

The computer programs may include: (i) descriptive text to be parsed, such as HTML (hypertext markup language), XML (extensible markup language), or JSON (JavaScript Object Notation) (ii) assembly code, (iii) object code generated from source code by a compiler, (iv) source code for execution by an interpreter, (v) source code for compilation and execution by a just-in-time compiler, etc. As examples only, source code may be written using syntax from languages including C, C++, C#, Objective-C, Swift, Haskell, Go, SQL, R, Lisp, Java®, Fortran, Perl, Pascal, Curl, OCaml, Javascript®, HTML5 (Hypertext Markup Language 5th revision), Ada, ASP (Active Server Pages), PHP (PHP: Hypertext Preprocessor), Scala, Eiffel, Smalltalk, Erlang, Ruby, Flash®, Visual Basic®, Lua, MATLAB, SIMULINK, and Python®.

What is claimed is:

1. A method of controlling a suspension system of a vehicle, comprising:
    connecting a plurality of dampers to each other and a plurality of comfort valves via a plurality of hydraulic circuits;
    retrieving at least one of a target roll stiffness and a target pressure from a suspension control unit (SCU) of the suspension system;
    monitoring real-time data from at least one onboard sensor or system, the real-time data including data reflecting at least one of fluid pressure within at least one of the hydraulic circuits, damper displacement for at least one of the dampers, lateral acceleration of the vehicle, vehicle speed, and steering wheel angle;
    calculating an effective roll stiffness of the suspension system based on the real-time data;
    reporting at least one of the target roll stiffness and the effective roll stiffness to a driver assistance system;
    generating and updating a vehicle stability model in the driver assistance system based on a combination of the real-time data and at least one of the target roll stiffness and the effective roll stiffness;
    utilizing the vehicle stability model to determine if the vehicle can complete an initiated turn without oversteer or understeer based on the target roll stiffness or the effective roll stiffness;
    utilizing the vehicle stability model to determine if the vehicle can complete the initiated turn at a different target stiffness without oversteer or understeer if the vehicle cannot complete the initiated turn without oversteer or understeer at the target roll stiffness or the effective roll stiffness;
    sending a request from the driver assistance system to the suspension control unit (SCU) for a new comfort valve setting corresponding to the different target stiffness in response to determining that the vehicle can complete the initiated turn at the different target stiffness without oversteer or understeer; and
    initiating the new comfort valve setting corresponding to the different target stiffness by actuating at least one comfort valve in the plurality of comfort valves based on the new comfort valve setting.

2. The method as set forth in claim 1, further comprising the steps of:
    calculating a roll moment based on the fluid pressure monitored within at least one of the hydraulic circuits;

calculating a roll angle based on the damper displacement monitored for at least one of the dampers; and
calculating the effective roll stiffness by dividing the roll moment by the roll angle.

3. The method as set forth in claim 1, further comprising the steps of:
calculating a roll angle based on the damper displacement monitored for at least one of the dampers; and
calculating the effective roll stiffness based on the roll angle and the lateral acceleration of the vehicle.

4. The method as set forth in claim 1, further comprising the steps of:
calculating a roll moment based on the fluid pressure monitored within at least one of the hydraulic circuits; and
calculating the effective roll stiffness based on the roll moment and the lateral acceleration of the vehicle.

5. The method as set forth in claim 1, further comprising the steps of:
reiterating the method in response to determining that the vehicle can complete the initiated turn without oversteer or understeer at the target roll stiffness or the effective roll stiffness by returning to said step of retrieving at least one of the target roll stiffness and the target pressure.

6. The method as set forth in claim 1, wherein said step of utilizing the vehicle stability model to determine if the vehicle can complete the initiated turn without oversteer or understeer includes processing an initiated steering input that is derived from the real-time data for steering wheel angle.

7. The method as set forth in claim 1, further comprising the step of:
initiating a corrective action in response to determining that the vehicle cannot complete the initiated turn at any target stiffness without oversteer or understeer, wherein the corrective action includes initiating at least one of an interventional throttle input, an interventional brake input, and an interventional steering input.

8. The method as set forth in claim 1, wherein said step of initiating the new comfort valve setting corresponding to the different target stiffness by actuating at least one comfort valve in the plurality of comfort valves based on the new comfort valve setting includes closing at least one comfort valve in the plurality of comfort valves to increase roll stiffness in the suspension system.

9. A method of controlling a suspension system of a vehicle, comprising:
connecting a plurality of dampers to each other and a plurality of comfort valves via a plurality of hydraulic circuits;
retrieving at least one of a target pitch stiffness and a target pressure from a suspension control unit (SCU) of the suspension system;
monitoring real-time data from at least one onboard sensor or system, the real-time data including data reflecting at least one of fluid pressure within at least one of the hydraulic circuits, damper displacement for at least one of the dampers, longitudinal acceleration of the vehicle, and vehicle speed;
calculating an effective pitch stiffness of the suspension system based on the real-time data;
reporting at least one of the target pitch stiffness and the effective pitch stiffness to a driver assistance system;
generating and updating a vehicle stability model in the driver assistance system based on a combination of the real-time data and at least one of the target pitch stiffness and the effective pitch stiffness;
utilizing the vehicle stability model to determine if a different target stiffness should be implemented based on an initiated throttle input or an initiated brake input;
sending a request from the driver assistance system to the suspension control unit (SCU) for a new comfort valve setting corresponding to the different target stiffness in response to determining that a different target stiffness should be implemented for the initiated throttle input or initiated brake input; and
initiating the new comfort valve setting corresponding to the different target stiffness by actuating at least one comfort valve in the plurality of comfort valves based on the new comfort valve setting.

10. The method as set forth in claim 8, further comprising the steps of:
calculating a pitch moment based on the fluid pressure monitored within at least one of the hydraulic circuits;
calculating a pitch angle based on the damper displacement monitored for at least one of the dampers; and
calculating the effective pitch stiffness by dividing the pitch moment by the pitch angle.

11. The method as set forth in claim 8, further comprising the steps of:
calculating a pitch angle based on the damper displacement monitored for at least one of the dampers; and
calculating the effective pitch stiffness based on the pitch angle and the longitudinal acceleration of the vehicle.

12. The method as set forth in claim 8, further comprising the steps of:
calculating a pitch moment based on the fluid pressure monitored within at least one of the hydraulic circuits; and
calculating the effective pitch stiffness based on the pitch moment and the longitudinal acceleration of the vehicle.

13. The method as set forth in claim 8, wherein said step of utilizing the vehicle stability model to determine if a different target stiffness should be implemented is based at least in part on whether the driver assistance system has initiated a corrective action in the form of an interventional throttle input or an interventional brake input.

14. The method as set forth in claim 8, wherein said step of initiating the new comfort valve setting corresponding to the different target stiffness by actuating at least one comfort valve in the plurality of comfort valves based on the new comfort valve setting includes closing at least one comfort valve in the plurality of comfort valves to increase pitch stiffness in the suspension system.

15. A suspension system of a vehicle, comprising:
a plurality of dampers connected in fluid communication with each other and a plurality of comfort valves via a plurality of hydraulic circuits;
at least one onboard sensor configured to generate real-time data regarding the vehicle;
a suspension control unit (SCU) arranged in electronic communication with said plurality of comfort valves and said at least one onboard sensor;
said suspension control unit (SCU) including a processor and memory configured to monitor said real-time data generated by said at least one onboard sensor, retrieve at least one of a target roll stiffness, a target pitch stiffness, and a target pressure of the suspension system, and calculate at least one of an effective roll stiffness and an effective pitch stiffness of the suspension system based on said real-time data;

a driver assistance system arranged in electronic communication with said suspension control unit (SCU); and said driver assistance system including a processor and memory configured to generate and update a vehicle stability model based on a combination of said real-time data and at least one of said target roll stiffness, said target pitch stiffness, said effective roll stiffness, and said effective pitch stiffness, wherein said driver assistance system is programmed to determine if the vehicle can complete an initiated turn without oversteer or understeer based on at least one of said target roll stiffness, said target pitch stiffness, said effective roll stiffness, and said effective pitch stiffness, determine if the vehicle can complete the initiated turn at a different target stiffness without oversteer or understeer if the vehicle cannot complete the initiated turn without oversteer or understeer, and send a request to said suspension control unit (SCU) for a new comfort valve setting corresponding to said different target stiffness in response to determining that the vehicle can complete the initiated turn at said different target stiffness without oversteer or understeer, wherein said suspension control unit (SCU) is programmed to initiate said new comfort valve setting corresponding to said different target stiffness by actuating at least one comfort valve in said plurality of comfort valves based on said new comfort valve setting.

16. The suspension system as set forth in claim 15, wherein said at least one onboard sensor includes at least one pressure sensor configured to generate a pressure sensor signal indicative of a fluid pressure within at least one of said hydraulic circuits and a damper displacement signal configured to generate a damper displacement signal indicative of damper displacement for at least one of said dampers and wherein at least one of said suspension control unit (SCU) and said driver assistance system is programmed to calculate a roll moment and a pitch moment from said fluid pressure indicated by said pressure sensor signal, calculate a roll angle and a pitch angle from said damper displacement indicated by said damper displacement signal, calculate said effective roll stiffness by dividing said roll angle by said roll moment, and calculate said effective pitch stiffness by dividing said pitch angle by said pitch moment.

17. The suspension system as set forth in claim 15, wherein said at least one onboard sensor includes at least one damper displacement sensor configured to generate a damper displacement signal indicative of damper displacement for at least one of said dampers and at least one accelerometer configured to generate at least one of a lateral acceleration signal and a longitudinal acceleration signal indicative of lateral and longitudinal accelerations of the vehicle and wherein at least one of said suspension control unit (SCU) and said driver assistance system is programmed to calculate a roll angle and a pitch angle from said damper displacement indicated by said damper displacement signal, calculate said effective roll stiffness based on said roll angle and said lateral acceleration indicated by said lateral acceleration signal, and calculate an effective pitch stiffness based on said pitch angle and said longitudinal acceleration indicated by said longitudinal acceleration signal.

18. The suspension system as set forth in claim 15, wherein said at least one onboard sensor includes at least one pressure sensor configured to generate a pressure sensor signal indicative of a fluid pressure within at least one of said hydraulic circuits and at least one accelerometer configured to generate at least one of a lateral acceleration signal and a longitudinal acceleration signal indicative of lateral and longitudinal accelerations of the vehicle and wherein at least one of said suspension control unit (SCU) and said driver assistance system is programmed to calculate a roll moment and a pitch moment from said fluid pressure indicated by said pressure sensor signal, calculate said effective roll stiffness based on said roll moment and said lateral acceleration indicated by said lateral acceleration signal, and calculate said effective pitch stiffness based on said pitch moment and said longitudinal acceleration indicated by said longitudinal acceleration signal.

19. The suspension system as set forth in claim 15, wherein said driver assistance system is programmed to initiate a corrective action in response to determining that the vehicle cannot complete the initiated turn at any target stiffness without oversteer or understeer, said corrective action including at least one of an interventional throttle input, an interventional brake input, and an interventional steering input.

20. The suspension system as set forth in claim 15, wherein said plurality of comfort valves are electro-mechanical valves and said suspension control unit (SCU) initiates said new comfort valve setting corresponding to said different target stiffness by closing at least one of said comfort valves to increase roll stiffness or pitch stiffness in said suspension system.

* * * * *